(12) United States Patent
Grabarnik et al.

(10) Patent No.: US 12,493,182 B2
(45) Date of Patent: *Dec. 9, 2025

(54) OPTICAL SYSTEM INCLUDING SELECTIVE ILLUMINATION

(71) Applicant: LUMUS LTD., Ness Ziona (IL)

(72) Inventors: Shimon Grabarnik, Rehovot (IL); Tsion Eisenfeld, Ashkelon (IL)

(73) Assignee: LUMUS LTD., Ness Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,540

(22) Filed: Oct. 10, 2024

(65) Prior Publication Data

US 2025/0035923 A1   Jan. 30, 2025

Related U.S. Application Data

(63) Continuation of application No. 18/252,827, filed as application No. PCT/US2021/061942 on Dec. 6, 2021, now Pat. No. 12,135,419.

(60) Provisional application No. 63/130,957, filed on Dec. 28, 2020, provisional application No. 63/121,937, filed on Dec. 6, 2020.

(51) Int. Cl.
*G09G 5/00* (2006.01)
*G02B 27/00* (2006.01)
*G06F 3/01* (2006.01)
*G06V 10/141* (2022.01)

(52) U.S. Cl.
CPC ..... *G02B 27/0068* (2013.01); *G02B 27/0093* (2013.01); *G06F 3/013* (2013.01); *G06V 10/141* (2022.01)

(58) Field of Classification Search
CPC ............ G02B 27/0068; G02B 27/0093; G06V 10/141; G06F 3/013
USPC .......................................................... 345/156
See application file for complete search history.

(56) References Cited

U.S. PATENT DOCUMENTS

| 10,268,268 | B1* | 4/2019 | Trail ...................... H04N 23/56 |
| 12,135,419 | B2* | 11/2024 | Grabarnik .............. G06V 40/18 |
| 2017/0131765 | A1* | 5/2017 | Perek .................... G06F 3/0304 |
| 2018/0114298 | A1 | 4/2018 | Malaika et al. |
| 2018/0284884 | A1 | 10/2018 | Sulai et al. |
| 2022/0146836 | A1* | 5/2022 | Lanman ................. G06F 3/013 |

FOREIGN PATENT DOCUMENTS

| WO | 2012174364 A2 | 12/2012 |
| WO | 2020146559 A1 | 7/2020 |

OTHER PUBLICATIONS

Decision of Rejection dated Oct. 2, 2025 received in Japanese Patent Application No. 2023-532233.

* cited by examiner

*Primary Examiner* — Jennifer T Nguyen

(74) *Attorney, Agent, or Firm* — Scully, Scott, Murphy & Presser

(57) ABSTRACT

In an embodiment, an apparatus is disclosed that includes at least one processor. The at least one processor is configured to select a light source from a plurality of lights sources based at least in part on a location of a pupil of an eye relative to an eye motion box. The selected light source is configured to illuminate a portion of the eye motion box that corresponds to the location of the pupil with a light beam. The at least one processor is further configured to activate the selected light source to illuminate the portion of the eye motion box.

20 Claims, 31 Drawing Sheets

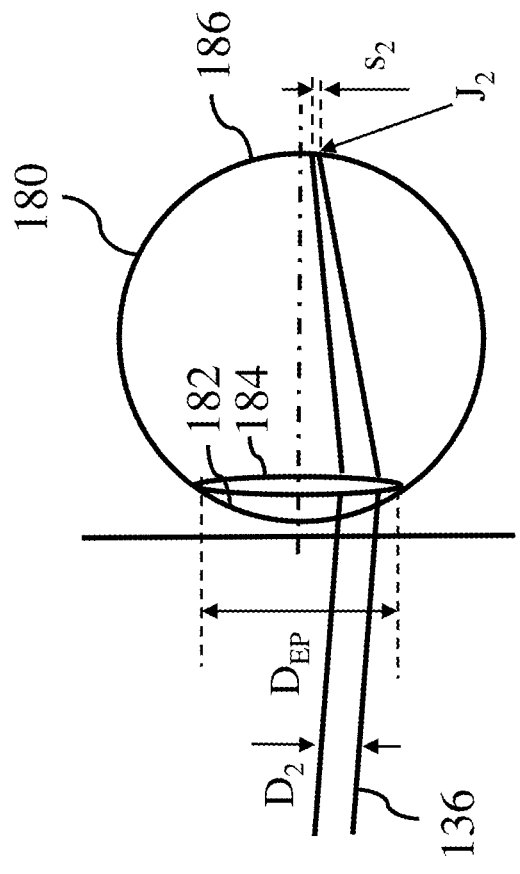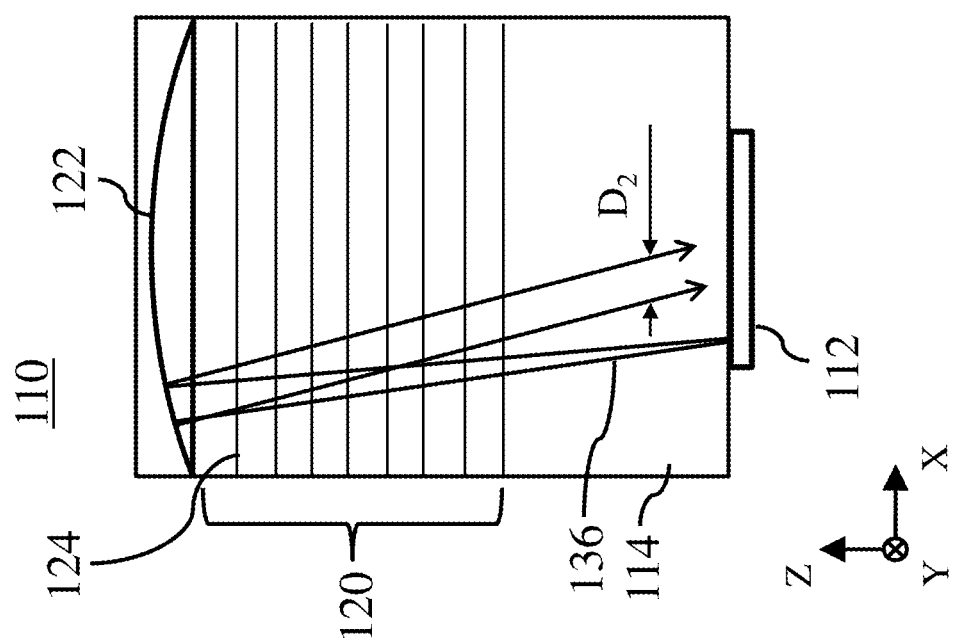
FIG. 7B
FIG. 7A

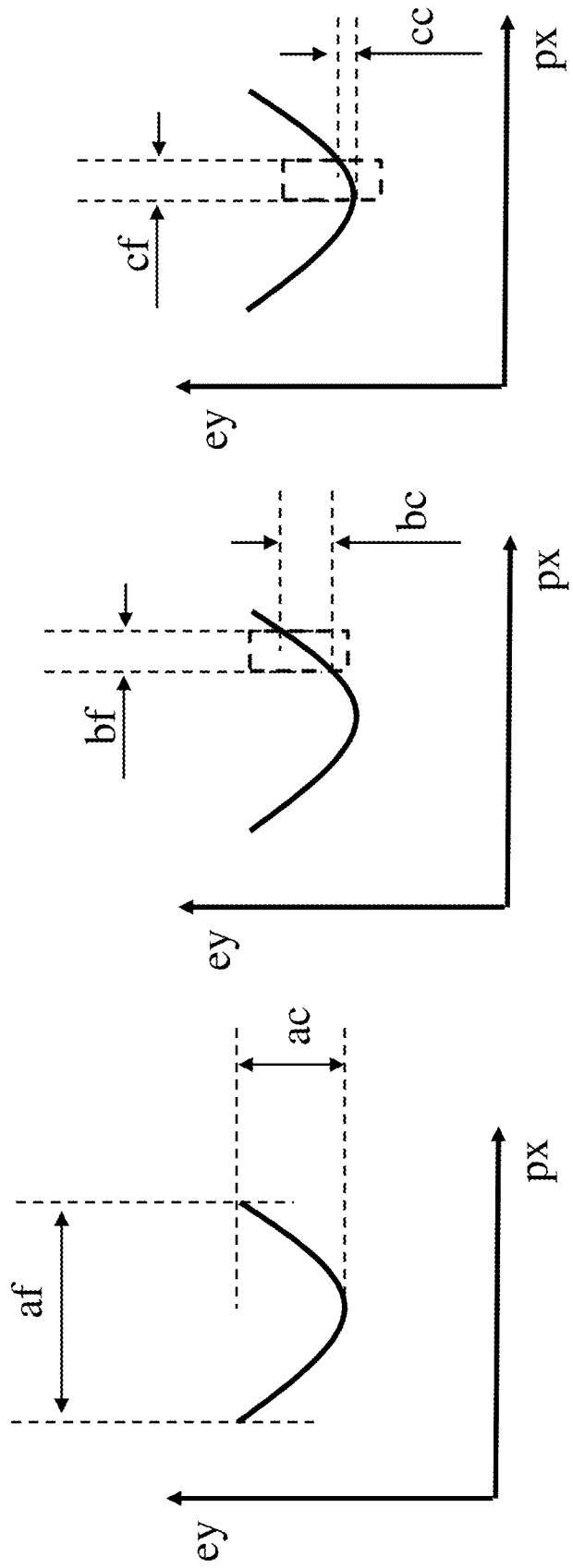

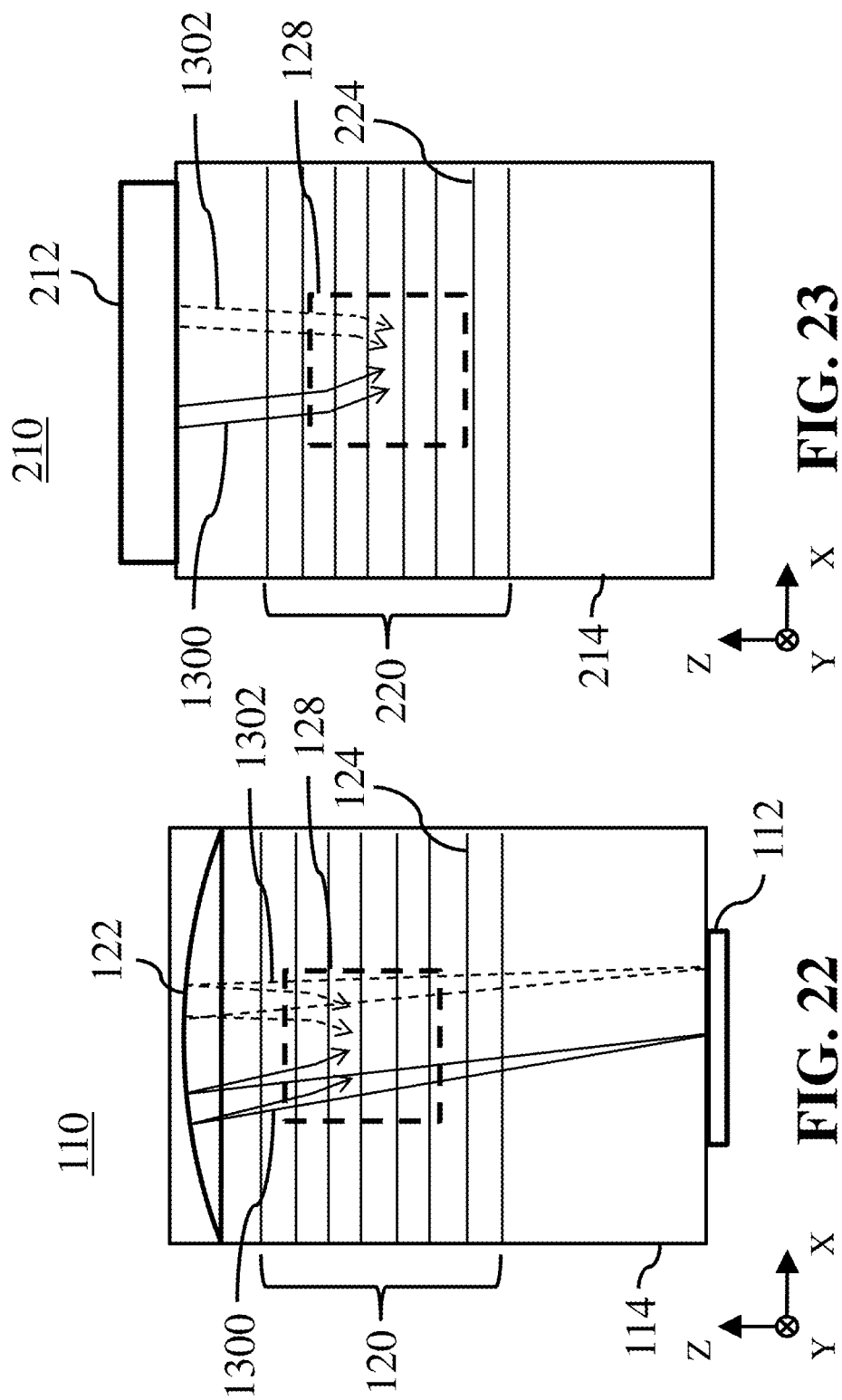

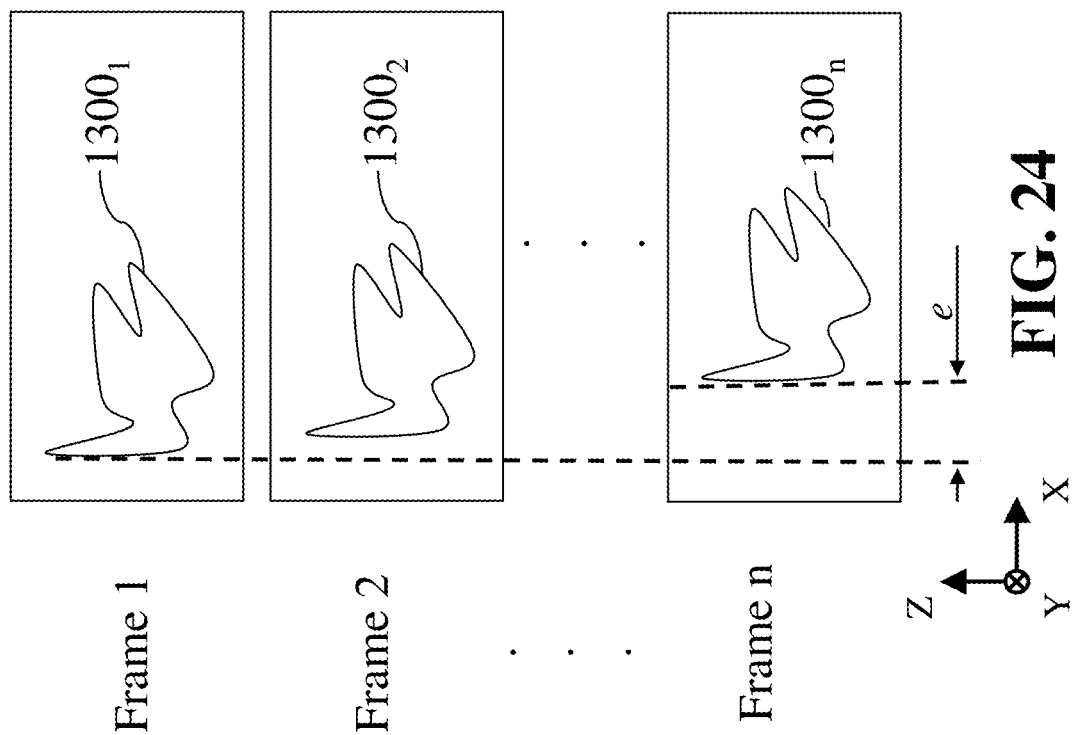

OPTICAL SYSTEM INCLUDING SELECTIVE ILLUMINATION

CROSS-REFERENCE TO RELATED APPLICATIONS

This application claims the benefit of U.S. application Ser. No. 18/252,827 entitled "OPTICAL SYSTEM INCLUDING SELECTIVE ILLUMINATION" filed on May 12, 2023, U.S. Provisional Application No. 63/130,957 entitled "DISPLAYS EMPLOYING SELECTIVE EYE PUPIL ILLUMINATION WITH OPTIONAL LIGHT FIELD PROJECTION" filed on Dec. 28, 2020, and U.S. Provisional Application No. 63/121,937 entitled "DISPLAYS EMPLOYING SELECTIVE EYE MOTION BOX ILLUMINATION" filed on Dec. 6, 2020, the entire contents of each of which are incorporated herein by reference.

BACKGROUND OF THE SPECIFICATION

The present disclosure relates to optical systems. More specifically, the present disclosure relates to optical systems having selective illumination that may, in some embodiments, be used in near-eye display systems.

Optical systems such as near-eye display systems typically illuminate the eye of a user in a manner which may lead to potential aberrations which result in reduced image quality. For example, an optical system may illuminate the entire pupil with a light beam of an image. Due to aberrations in the light beam such as, e.g., coma, astigmatism or any other aberration, portions of the image can become blurred and possibly distorted as those portions pass through the pupil and reach the retina.

SUMMARY

In an embodiment, an apparatus is disclosed that includes at least one processor. The at least one processor is configured to select a light source from a plurality of lights sources based at least in part on a location of a pupil of an eye relative to an eye motion box. The selected light source is configured to illuminate a portion of the eye motion box that corresponds to the location of the pupil with a light beam. The at least one processor is further configured to activate the selected light source to illuminate the portion of the eye motion box.

In some embodiments, the selected light source is configured to illuminate the portion of the eye motion box that corresponds to only a portion of the pupil with the light beam.

In an embodiment, the at least one processor is configured to determine a distortion to be applied to the light beam based at least in part on the selected light source and to cause a modification of the light beam based at least in part on the determined distortion.

In another embodiment, determining the distortion to be applied to the light beam based at least in part on the selected light source includes determining a correction to the light beam for an aberration that is induced by a collimator.

In some embodiments, causing the modification of the light beam based at least in part on the determined distortion includes causing a spatial light modulator to modify the light beam based at least in part on the determined distortion.

In an embodiment, the light beam illuminates the portion of the eye motion box based at least in part on a plurality of elements of a coupling-out arrangement. At least one of a reflectivity and an intensity of each of the elements is selectively adjustable between at least two states. The at least one processor is further configured to determine a target state of a given element of the plurality of elements based at least in part on the selected light source and cause the given element to be set to the target state.

In another embodiment, the light source is a first light source and the at least one processor is configured to select a second light source of the plurality of light sources. The second light source is configured to illuminate the portion of the eye motion box.

In some embodiments, a method is disclosed including selecting a light source from a plurality of lights sources based at least in part on a location of a pupil of an eye relative to an eye motion box. The selected light source is configured to illuminate a portion of the eye motion box that corresponds to the location of the pupil with a light beam. The method further includes activating the selected light source to illuminate the portion of the eye motion box.

In some embodiments, the selected light source is configured to illuminate the portion of the eye motion box that corresponds to only a portion of the pupil with the light beam.

In an embodiment, wherein the method further includes determining a distortion to be applied to the light beam based at least in part on the selected light source and causing a modification of the light beam based at least in part on the determined distortion.

In another embodiment, determining the distortion to be applied to the light beam based at least in part on the selected light source includes determining a correction to the light beam for an aberration that is induced by a collimator.

In some embodiments, causing the modification of the light beam based at least in part on the determined distortion includes causing a spatial light modulator to modify the light beam based at least in part on the determined distortion.

In an embodiment, the light beam illuminates the portion of the eye motion box based at least in part on a plurality of elements of a coupling-out arrangement where at least one of a reflectivity and an intensity of each of the elements is selectively adjustable between at least two states. The method further includes determining a target state of a given element of the plurality of elements based at least in part on the selected light source and causing the given element to be set to the target state.

In another embodiment, the light source is a first light source and the method further includes selecting a second light source of the plurality of light sources. The second light source is configured to illuminate the portion of the eye motion box.

In an embodiment, an optical system is disclosed. The optical system includes a plurality of light sources and a light-guide optical element includes a coupling-out arrangement that is configured to direct light beams received from the plurality of light sources toward an eye motion box of the optical system. The optical system further includes a controller that is configured to select a light source from the plurality of light sources based at least in part on a location of a pupil of an eye relative to the eye motion box. The selected light source is configured to emit a light beam that, when directed by the coupling-out arrangement, illuminates a portion of the eye motion box that corresponds to the location of the pupil. The controller is further configured to activate the selected light source to illuminate the portion of the eye motion box.

In some embodiments, the optical system further includes an eye motion tracking system that is configured to determine the location of the pupil. The controller is configured to determine the portion of the eye motion box that corresponds to the location of the pupil determined by the eye motion tracking system.

In an embodiment, the optical system further includes a spatial light modulator disposed between the plurality of light sources and the light-guide optical element. The controller is configured to determine a distortion to be applied to the light beam based at least in part on the selected light source and the spatial light modulator is configured to modify the light beam based at least in part on the determined distortion.

In another embodiment, the optical system further includes an optical arrangement that is configured to direct the light beam from the selected light source toward the spatial light modulator. The optical arrangement includes a first lens, a second lens, a first micro-lens array disposed between the first lens and the second lens and a second micro-lens array disposed between the first micro-lens array and the second lens.

In some embodiments, the plurality of light sources are located in the focal plane of the first lens, the second micro-lens array is located in the focal plane of the first micro-lens array and the spatial light modulator is located in the focal plane of the second lens.

In an embodiment, the coupling-out arrangement includes a plurality of elements. The controller is configured to selectively adjust at least one of a reflectivity and an intensity of each of the elements between at least two states.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 7A is a schematic diagram illustrating a beam of light projected by a first sub-aperture of the POD of the example image projection assembly of FIGS. 2A-2C according to an embodiment.

FIG. 7B is a diagram illustrating the beam of light of FIG. 7A being projected onto an eye according to an embodiment.

FIGS. 9A-9C illustrate example aberration plots of the beams of light of FIGS. 6A-8B as projected onto the eye according to an embodiment.

FIG. 22 is a schematic diagram illustrating the image projection assembly of FIGS. 2A-2C showing light beams forming a time-multiplexed light field image according to an embodiment.

FIG. 23 is a schematic diagram illustrating the image projection assembly of FIG. 3 showing light beams forming a time-multiplexed light field image according to an embodiment.

FIG. 24 is a diagram illustrating a time-multiplexed light field image according to an embodiment.

DETAILED DESCRIPTION

Figure 1:
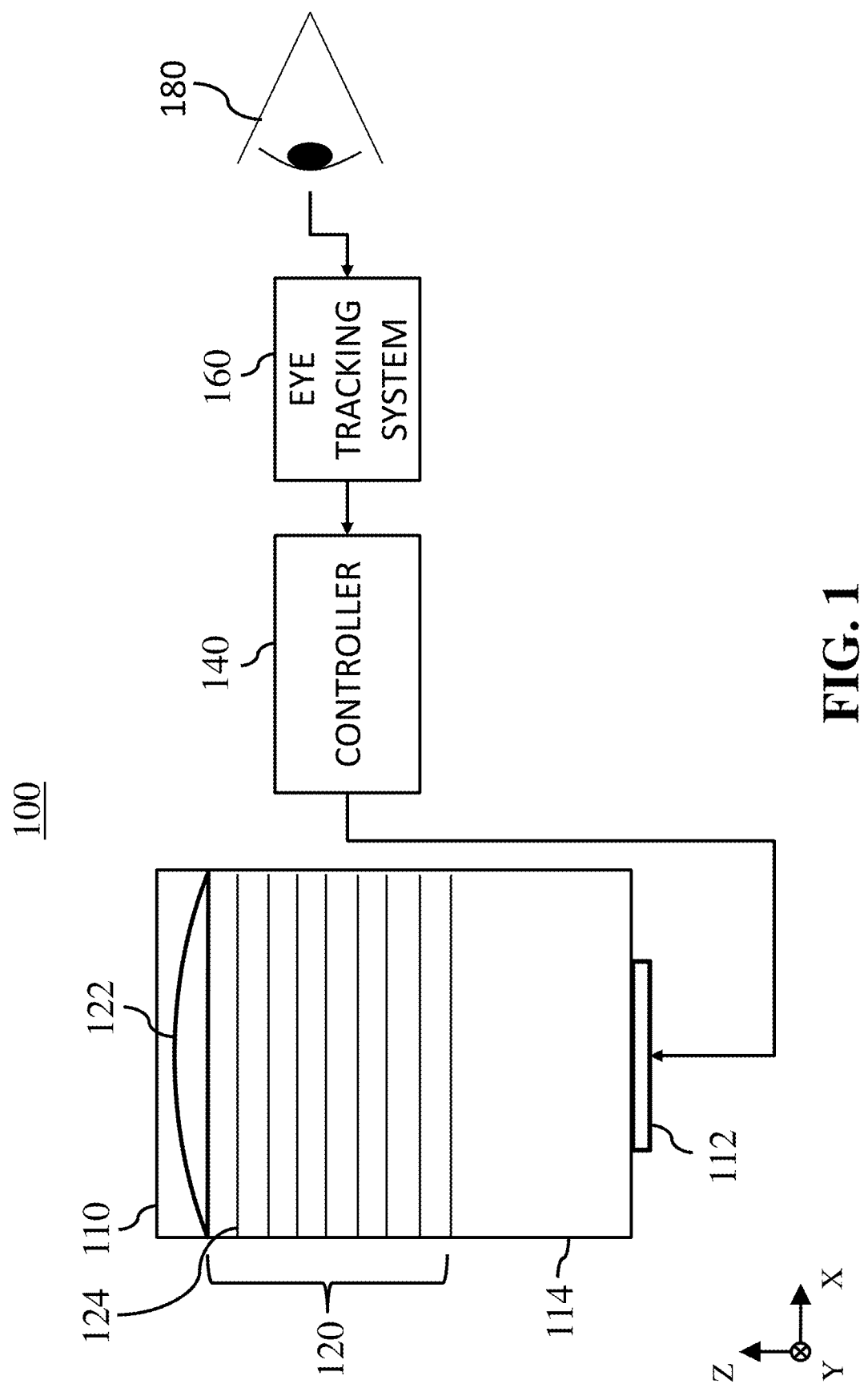
FIG. 1 is a schematic diagram of an example optical system according to an embodiment.
Figure 2:
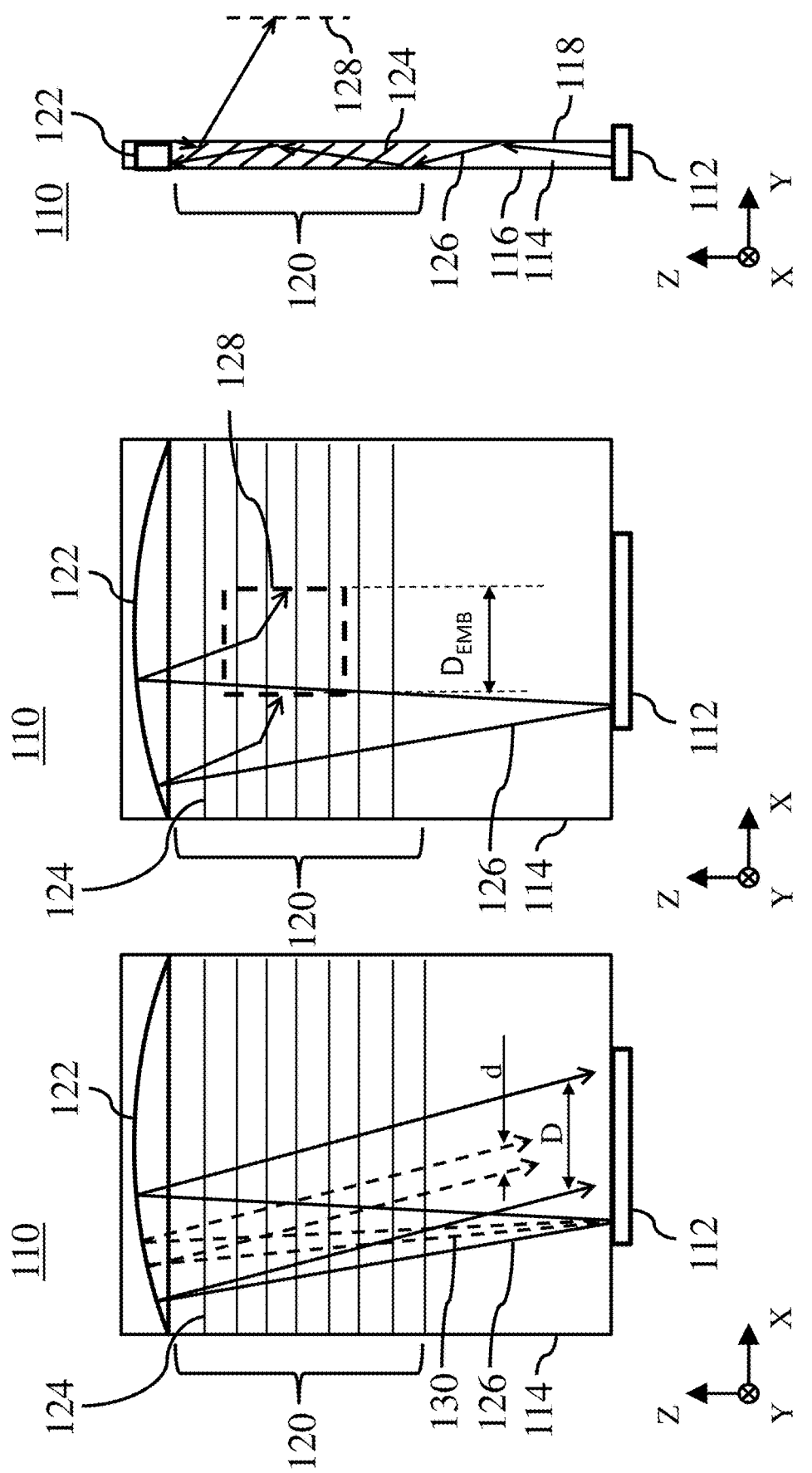
FIGS. 2A-2C are schematic diagrams illustrating an example image projection assembly of the optical system of FIG. 1 for 2D pupil expansion according to an embodiment.

In optical systems such as near-eye display systems, light beams are output from a display system to a target surface such as the eye of a user that is in close proximity to the display system. Often such optical systems illuminate the entire eye, or the entire pupil of the eye, when projecting an image. In some cases, such a blanket illumination of the eye or pupil can be combined with the aberrations of the optical projection system, degrading the quality of the resulting image for the user. For example, as the light beams pass through the lens of the eye and are focused onto the retina, some portions of the image may become blurred, distorted or have other aberrations as seen by the user.

The disclosed optical system in some embodiments is configured to reduce or inhibit such aberrations by selectively illuminating only the portion of the pupil that is needed for a user to see an image in good quality. Such selective illumination is also referred to herein as partial eye pupil illumination. For example, partial eye pupil illumination may be beneficial for achieving improved image quality as compared to full eye illumination and may utilize a less complex optical system. In some embodiments, the partial eye pupil illumination may be combined with displacement of the projected images to create a time-multiplexed light field image which may provide a solution to the problem of vergence-accommodation conflict (VAC). VAC occurs when the brain receives mismatching cues between the distance of a virtual three-dimensional (3D) object, sometimes referred to as the vergence, and the focusing distance required for the eyes to focus on the virtual 3D object, sometimes referred to as the accommodation.

The disclosed optical system in some embodiments is also or alternatively configured to illuminate only a portion of an eye motion box (EMB) at a time, e.g., the portion of the EMB where the eye pupil is currently located, also referred to herein as selective EMB illumination. Selective EMB illumination may provide increased power efficiency in the optical system as compared to the illumination of the full EMB since the image illumination is distributed on a smaller area by the partial EMB illumination.

Partial eye pupil illumination, time-multiplexed light field imaging and selective EMB illumination may be utilized separately or together and provide the above-mentioned and other benefits to an optical system that may be configured as a near-eye display system.

With reference now to FIGS. 1 and 2A-2C an example optical system 100 is described. Optical system 100 includes an image projection assembly 110, a controller 140 and an eye tracking system 160. The eye tracking system 160 may be optional and is configured to track the location of the pupil of an eye 180 of a user and provide corresponding location information to the controller 140. The image projection assembly 110 includes a projection optics device (POD) 112 and a light-guide optical element (LOE) 114 and is configured to utilize two-dimensional (2D) pupil expansion to project an image onto the eye 180 of the user.

POD 112 includes an image generator, a spatial light modulator (SLM) 304 (FIG. 10) or other components typically included in an image projection assembly. Some or all of these components may be arranged on surfaces of one or more polarizing beamsplitter (PBS) cubes or other prism arrangements. The image generator includes an illumination source that provides illumination such as light beams or laser beams, corresponding to an image to be projected to the eye 180 of the user. Example illumination sources may include light emitting diodes (LEDs), micro-LEDs or other illumination sources.

The SLM 304 may be implemented as a light emitting SLM including components, such as an organic light emitting diode (OLED) display element, a backlit liquid crystal display (LCD) panel, a micro-LED display, a digital light processing (DLP) chip or another light emitting component, or may be implemented as a reflective SLM, such as a liquid crystal on silicon (LCOS) chip. A beam splitter cube block may be interposed between the collimating optics and the SLM 304 to allow delivery of illumination to the surface of the SLM 304.

The SLM 304 is configured to modulate the projected intensity of each pixel of the illumination to generate the image. In some embodiments, the SLM 304 may provide a light beam that is divergent in the plane of the LOE 114, e.g., the plane of the major external surfaces 116 and 118 described below, from each pixel of the display. The light beam may be collimated in the plane of the LOE 114 after reflection from a reflective optical arrangement 122 of the LOE 114. In some embodiments, the light beam may be collimated in the plane of the LOE 114 but may not be collimated in the plane that is orthogonal to the LOE 114.

Alternatively, the POD 112 may include a scanning arrangement, e.g., a fast-scanning mirror, which scans illumination from a light source across an image plane of the POD 112 while the intensity of the illumination is varied synchronously with the motion on a pixel-by-pixel basis to project a desired intensity for each pixel.

The POD 112 also includes a coupling-in arrangement for injecting the illumination of the image into the LOE 114, e.g., a coupling-in reflector, angled coupling prism or any other coupling-in arrangement. In some embodiments, coupling between the POD 112 and the LOE 114 may include a direct coupling, e.g., the POD 112 may be in contact with a portion of the LOE 114, or may include a coupling via an additional aperture expanding arrangement for expanding the dimension of the aperture across which the image is injected in the plane of the LOE 114.

The POD 112 also includes an aperture or other components that may be utilized to limit the size of the illumination. For example, as seen in FIG. 2A, the POD 112 may be configured to output a light beam 126 using a first aperture size such that the light beam 126, once collimated by a reflective optical arrangement 122 of the LOE 114, has a width D and may be configured to output a second light beam 130 using a second aperture size that is smaller than the first aperture size, such that the light beam 130, once collimated by the reflective optical arrangement 122 of the LOE 114, has a width d that is smaller than the width D.

The LOE 114 includes a waveguide including first and second parallel major external surfaces 116 and 118 and edges that are not optically active, as shown, for example, in FIG. 2C. The LOE 114 also includes a coupling-out arrangement 120 and a reflective optical arrangement 122 such as a lens. The reflective optical arrangement 122 is configured to redirect the illumination that passes through the LOE 114 back toward the coupling-out arrangement 120 while also collimating the illumination, for example as seen in FIG. 2A. While reflective optical arrangement 122 is described above as a reflective lens, a wide range of other lens types and implementations may alternatively be utilized including, but not limited to, spherical, aspherical or freeform refractive lenses formed from glass or plastic, diffractive lenses, Fresnel lenses, reflective lenses, and any combination of the above.

The coupling-out arrangement 120 is configured to direct the illumination out of the LOE 114 towards the EMB 128 for projection onto the eye 180 of the user. In some embodiments, the coupling-out arrangement is illustrated as a plurality of parallel, partially reflective surfaces, also referred to herein as facets 124, that are arranged within the LOE 114 at an oblique angle to the major external surfaces 116 and 118 of the LOE 114. The facets 124 include angular-dependent coatings that provide high transmission at certain angles and partial reflection at other angles.

For example, the light beam 126 travels through the LOE 114 towards the reflective optical arrangement 122 by reflecting off the major external surfaces 116 and 118 as seen in FIG. 2C. The light beam 126 travels through the facets 124 to the reflective optical arrangement 122, e.g., due to the high transmission at the angle of travel, and the reflective optical arrangement 122 reflects, redirects and collimates the light beam 126 back toward the facets 124 with the width D. After reflection by the reflective optical arrangement 122, when the collimated light beam 126 encounters the facets 124, the light beam 126 is redirected by the facets 124 toward the EMB 128 with a width DEMB that is about the same as the width of the EMB 128, e.g., due to the partial reflection at the angle of travel of the light beam 126.

Although the description herein refers to facet-based coupling-out arrangements, any other coupling-out arrangements may alternatively be utilized including, for example, coupling-out arrangements having diffractive optical elements.

Reflective optical arrangement 122 may have a cylindrical optical power that reflects at least part of the illumination back toward the facets 124 in an in-plane direction by internal reflection from the major external surfaces 116 and 118. The illumination after reflection from reflective optical arrangement 122 is collimated both in a plane perpendicular to and in a plane parallel to the major external surfaces 116 and 118. The reflective optical arrangement 122 may be integrated with an edge of the LOE 114 and have a cylinder axis perpendicular to the major external surfaces 116 and 118 of the LOE 114. In some embodiments, the reflective optical arrangement 122 may include a diffractive optical element with cylindrical power integrated into the LOE 114.

The reflective optical arrangement 122 may have a high reflectivity in the range of angles corresponding to the illumination as it propagates through the LOE 114 and low reflectivity, e.g., transmissive or absorbing, at angles outside this range. In this way, the reflective optical arrangement 122 reflects the light emitted by the POD 112 which propagates in the LOE 114 by total internal reflection while reflection of light from any other light sources may be inhibited. For example, light from light sources in the outside world such as the sun will arrive at the reflective optical arrangement 122 at angles in the low reflectivity range and either be reflected away from the LOE 114 or absorbed. In this manner, the intensity of a potential ghost image caused by the outside light sources will be reduced. In some embodiments, the reflective optical arrangement 122 is formed with a reflectivity that depends on the incident angle of the light using, for example, a multi-layer coating technology that provides selective reflectivity and desired angles. In another embodiment, one or more volume Bragg gratings that have a high diffraction efficiency in a relatively narrow range of angles may be utilized to form the reflective optical arrangement 122.

Figure 3:
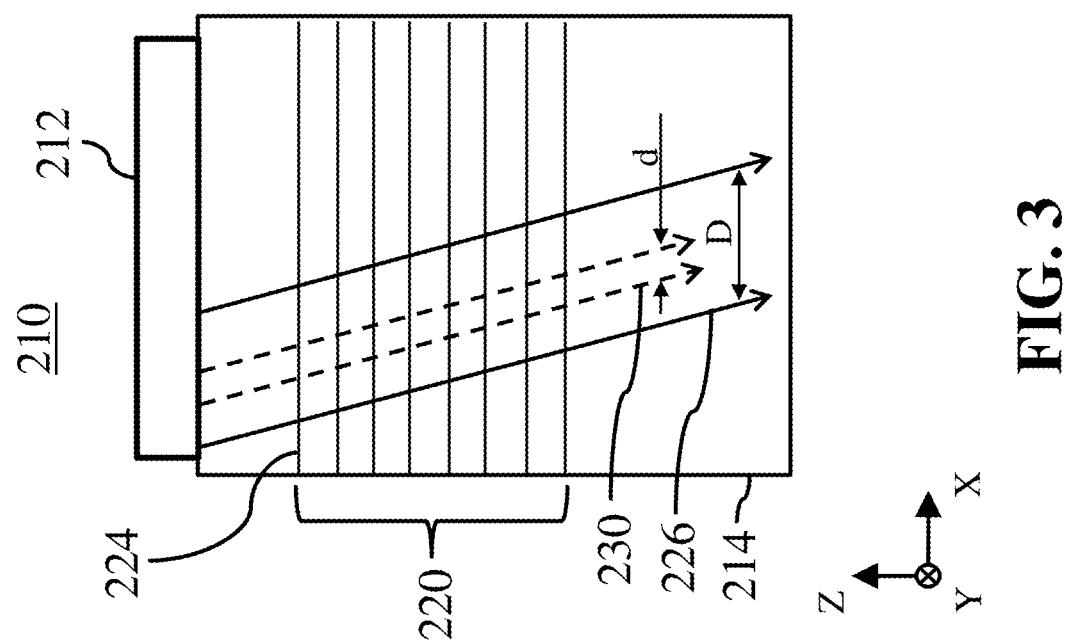
FIG. 3 is a schematic diagram illustrating an example image projection assembly of the optical system of FIG. 1 for 1D pupil expansion according to an embodiment.

With reference now to FIG. 3, an example image projection assembly 210 according to another embodiment is described. As illustrated in FIG. 3, like elements have similar reference numbers to the image projection assembly 110 of FIGS. 1 and 2A-2C. For example, image projection assembly 210 includes a POD 212, LOE 214, major external surfaces (not shown), coupling-out arrangement 220, facets 224 and other components similar to those described above for the image projection assembly 110. Image projection assembly 210 is configured to utilize one-dimensional (1D) pupil expansion to project an image onto the eye 180 of the user. In the embodiment of the image projection assembly 210, the POD 212 is attached to the LOE 214 at the top instead of using the reflective optical arrangement 122 to redirect the illumination back onto the facets 224. For example, illumination emitted from the POD 212 propagates through the LOE 214 and is gradually emitted toward the EMB (not shown) via the facets 224 of the coupling-out arrangement 220. In this embodiment, the illumination output by the POD 212 is already collimated when it enters the LOE 214.

Referring back to FIG. 1, the controller 140 includes a computing device having one or more processing devices, memory or other components. For example, the controller 140 may include a central processing unit (CPU), field-programmable gate array (FPGA), microcontroller, dedicated circuitry or any other components. The controller 140 is configured to control the POD 112 to generate and output images to the LOE 114 for projection to the eye 180 of the user as will be described in more detail below.

In some embodiments, controller 140 may be integrated into the image projection assembly 110 or integrated into a device including the image projection assembly 110 such as, e.g., glasses, a head mounted display or another device. In some embodiments, controller 140 may be located remote from the image projection assembly 110. For example, image projection assembly may include a wired or wireless communication device that is configured to communicate with controller 140. As an example, controller 140 may be included as part of a mobile device, or other computing device that is separate from the image projection assembly 110 or a device including the image projection assembly 110.

The eye tracking system 160 includes one or more eye tracking cameras, lasers or other optical devices that are configured to determine a location of the pupil 182 of the eye 180 of a user and to generate location information corresponding to the location, e.g., coordinates or other location information. The location information may be provided to the controller 140 for use in controlling the POD 112 to generate and output images to the LOE 114.

With reference now to FIGS. 2A through 9C, partial eye pupil illumination according to some embodiments will now be described and explained in more detail.

Figure 4:
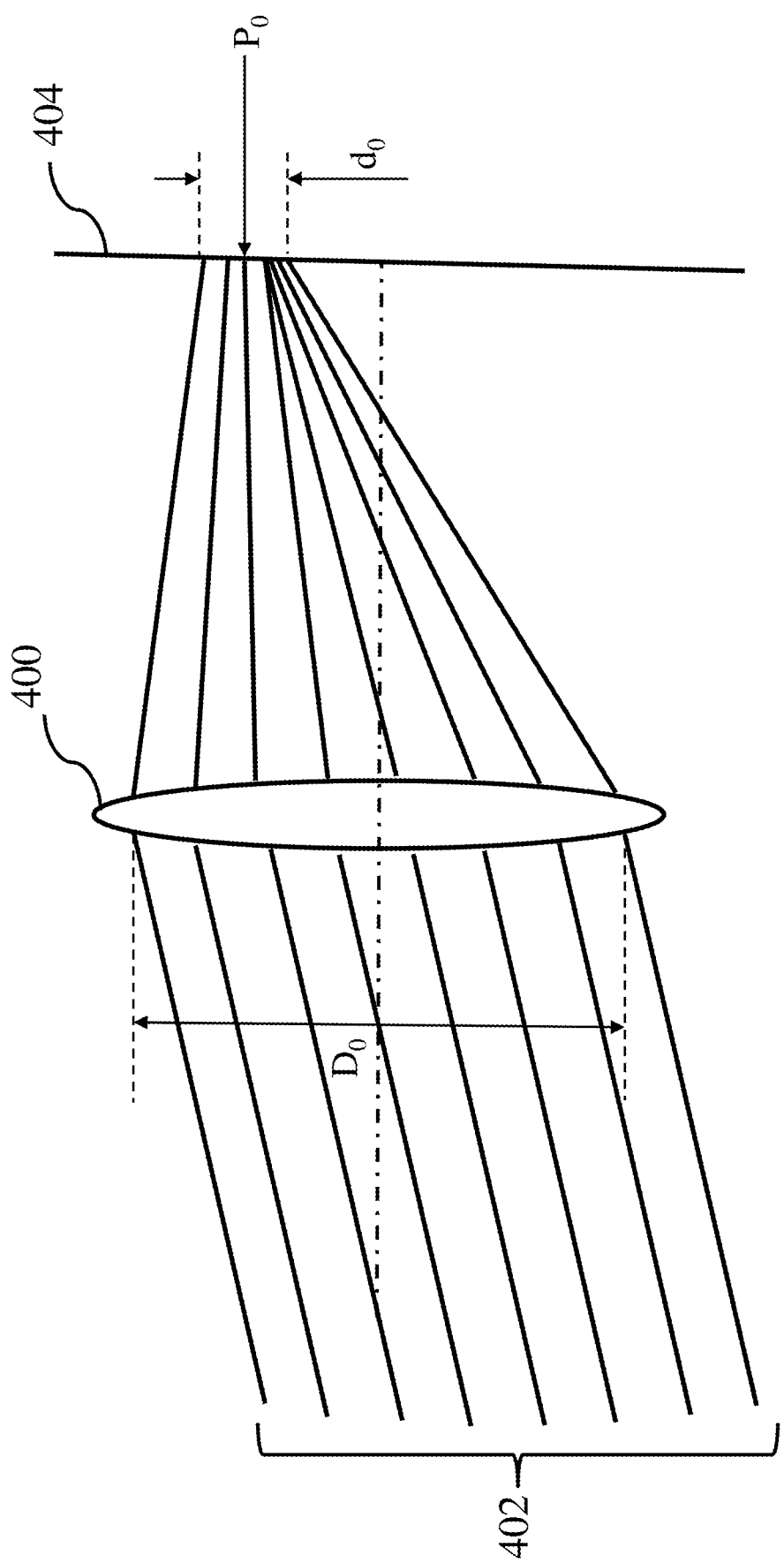
FIG. 4 is a diagram illustrating the projection of a light beam onto a surface according to an embodiment.

Referring now to FIG. 4, in an example scenario, an ideal lens 400 has an aperture Do. The lens 400 is illuminated by a parallel beam 402, in which the wavefront is not perfectly planar, but contains one or more optical aberrations. In this example scenario, the lens 400 produces an image at a point $P_0$ on a screen 404 that is located at the focal plane of the lens 400. Due to the aberrations present in the beam, the image is blurred and has a size do.

Figure 5:
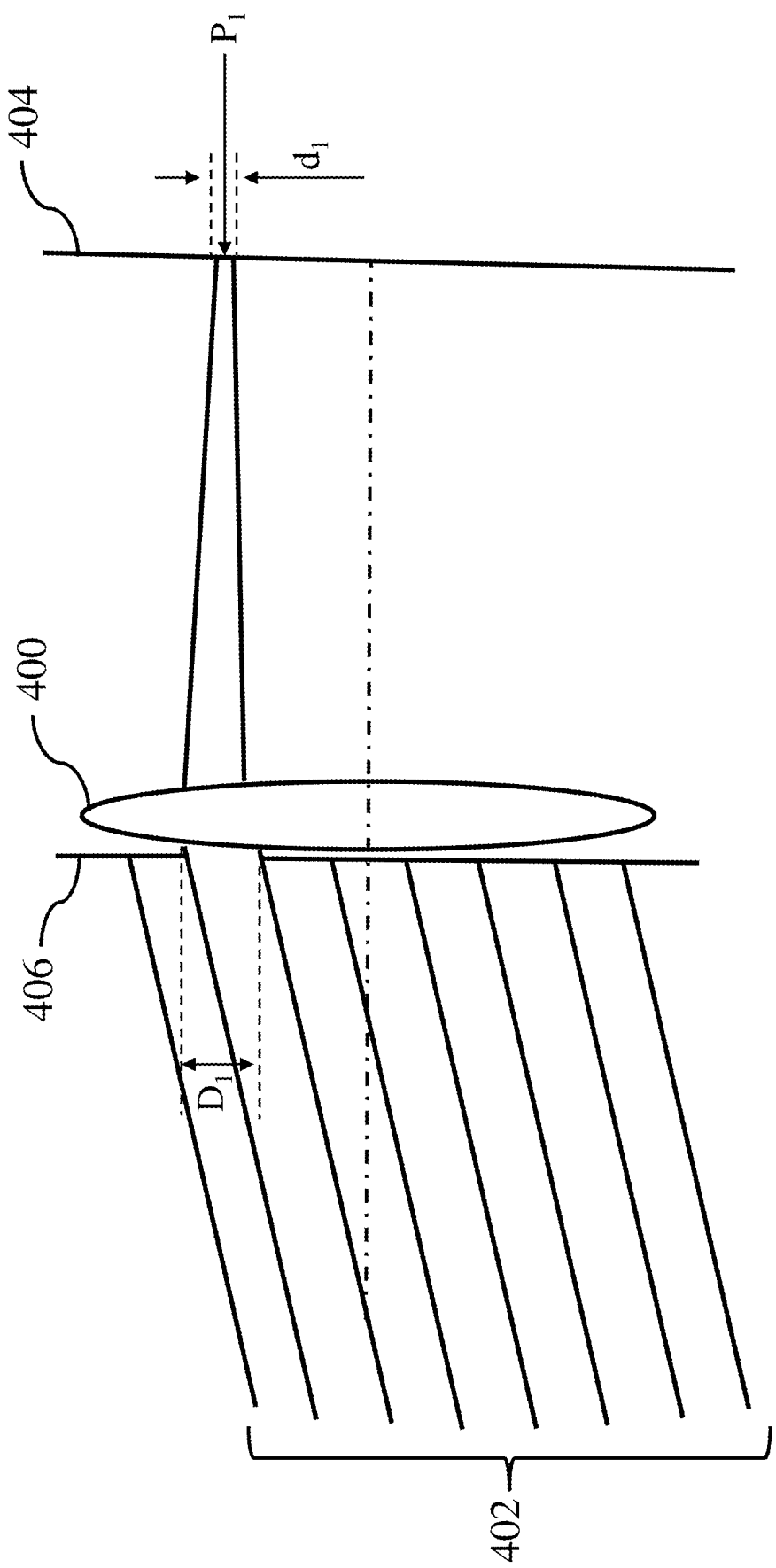
FIG. 5 is a diagram illustrating the projection of the light beam of FIG. 4 onto the surface through a sub-aperture according to an embodiment.

With reference now to FIG. 5, in another example scenario, the ideal lens 400 is illuminated by the same aberrated beam 402. However, in this example scenario, a diaphragm 406 is positioned in front of the lens 400 such that only a sub-aperture of diameter $D_1$ is illuminated by the beam 402, where $D_1$ is smaller than $D_0$. In this example scenario, the lens 400 produces an image at a point $P_1$ on the screen 404 that may in general be different from the point $P_0$ of the example scenario of FIG. 4. The image is blurred and has the size di which is smaller than the image size do of the image produced in the example scenario of FIG. 4.

As seen in the example scenarios of FIGS. 4 and 5, reducing the diameter of the aperture through which the lens 400 is exposed to the beam 402 may improve the image quality so long as the resulting geometrical image size di is larger than the diffraction limit of the aperture. Depending on the type of aberrations present in the beam 402, the position of the image changes based on the position of the illuminated sub-aperture $D_1$.

Figure 6A:
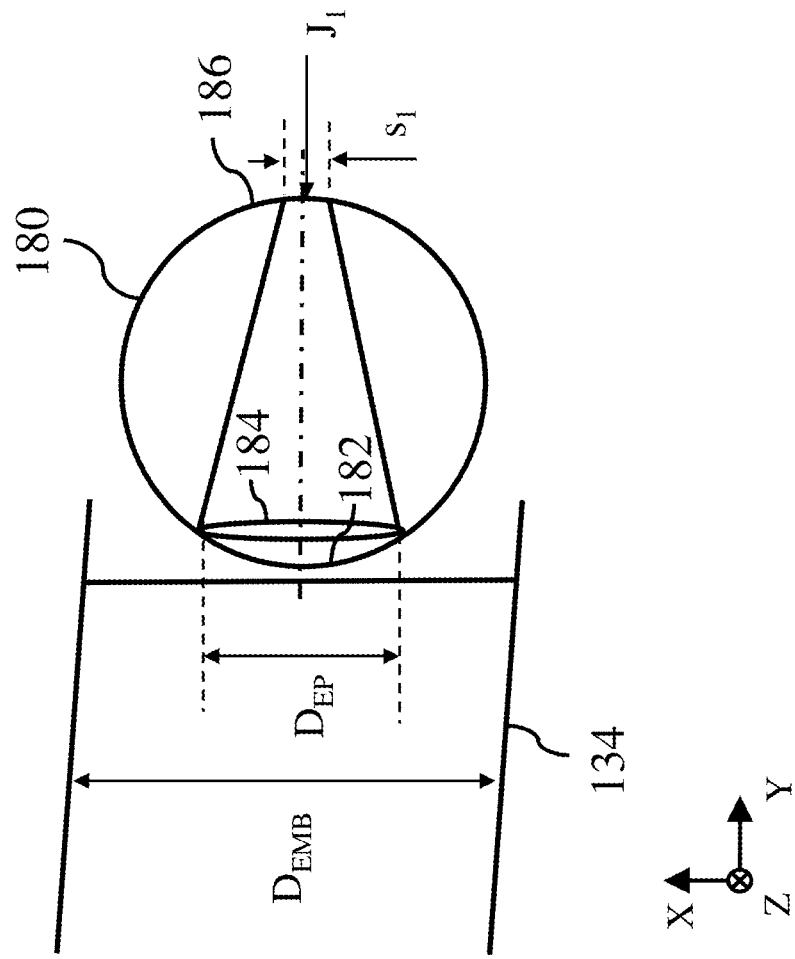
FIG. 6A is a schematic diagram illustrating a beam of light projected by a full aperture of a projection optics device (POD) of the example image projection assembly of FIGS. 2A-2C according to an embodiment.
Figure 6B:
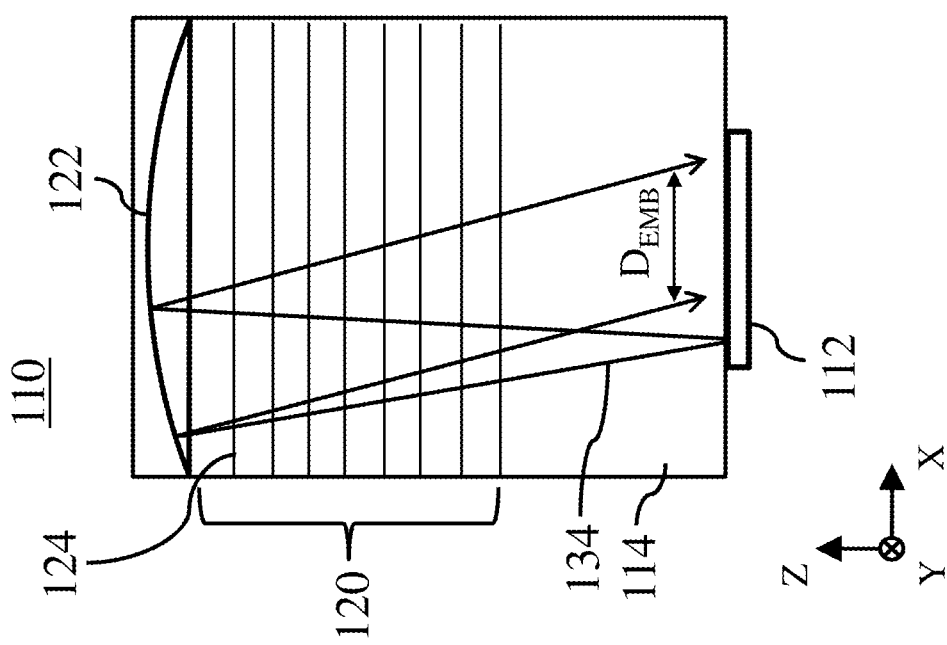
FIG. 6B is a diagram illustrating the beam of light of FIG. 6A being projected onto an eye according to an embodiment.

FIGS. 6A and 6B illustrate an example scenario using image projection assembly 110 with the full angular aperture of the POD 112 illuminated by a beam 134. The width of the collimated beam 134 after reflection from the reflective optical arrangement 122 is equal to DEMB, the width of the EMB 128. FIG. 6B illustrates an eye 180 of a user, where the collimated beam 134, having the width DEMB that is greater than a width DEP of the pupil 182 of the eye 180, illuminates the eye 180 and projects an image $J_0$ onto the retina 186 of the eye 180 via the lens 184 of the eye 180. In this example scenario, the resulting image $J_1$ projected onto the retina 186 is blurred and has a size $s_1$ due to the aberrations of the beam 134 collected by the pupil 182.

FIGS. 7A and 7B illustrate an example scenario using image projection assembly 110 according to an example embodiment where only a part of the angular aperture of the POD 112 in the plane of the LOE 114 is illuminated by a beam 136. For example, a selective illumination system in the POD 112, such as will be described in more detail below, may be utilized to illuminate only a portion of the angular aperture of the POD 112. In this example scenario, the angular aperture of the POD 112 in a plane normal to the plane of the major external surfaces 116 and 118 of the LOE 114 may be fully illuminated. The width of the collimated beam 136 after reflection from the reflective optical arrangement 122 is equal to $D_2$, which is smaller than the width DEP of the pupil 182, such that the collimated beam 136 only illuminates a portion of the pupil 182 as shown in FIG. 7B. The collimated beam 136 projects an image $J_2$ onto the retina 186 via the lens 184 of the eye 180. The image $J_2$ is projected on the retina 186 at a position that is different from the position of the image $J_1$, is blurred and has a size $s_2$ that is smaller than the size $s_1$ of the image $J_1$.

Figure 8A:
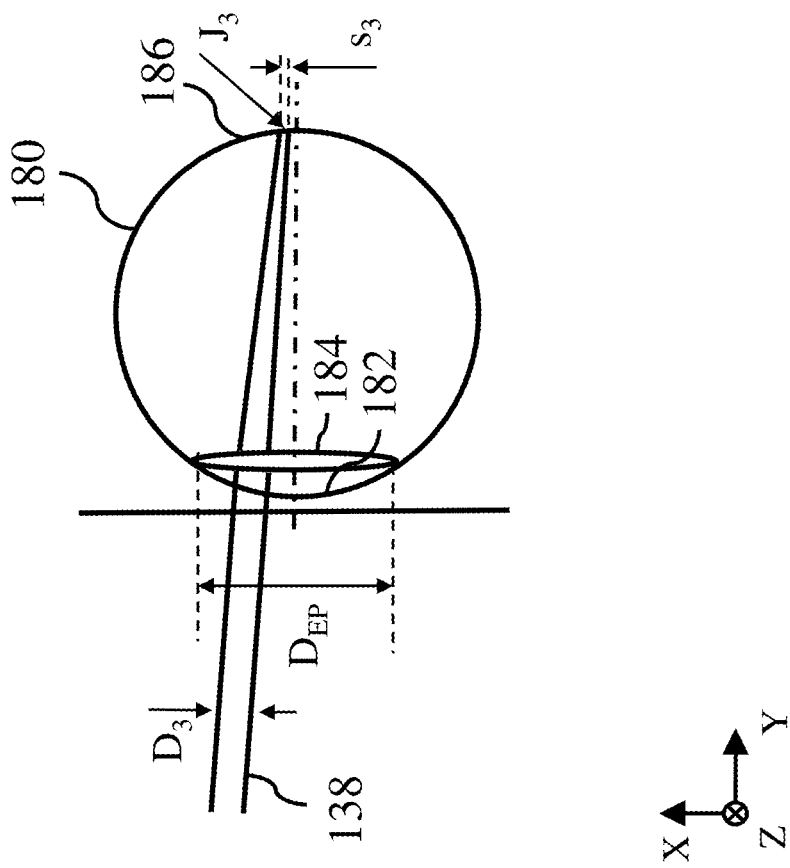
FIG. 8A is a schematic diagram illustrating a beam of light projected by a second sub-aperture of the POD of the example image projection assembly of FIGS. 2A-2C according to an embodiment.
Figure 8B:
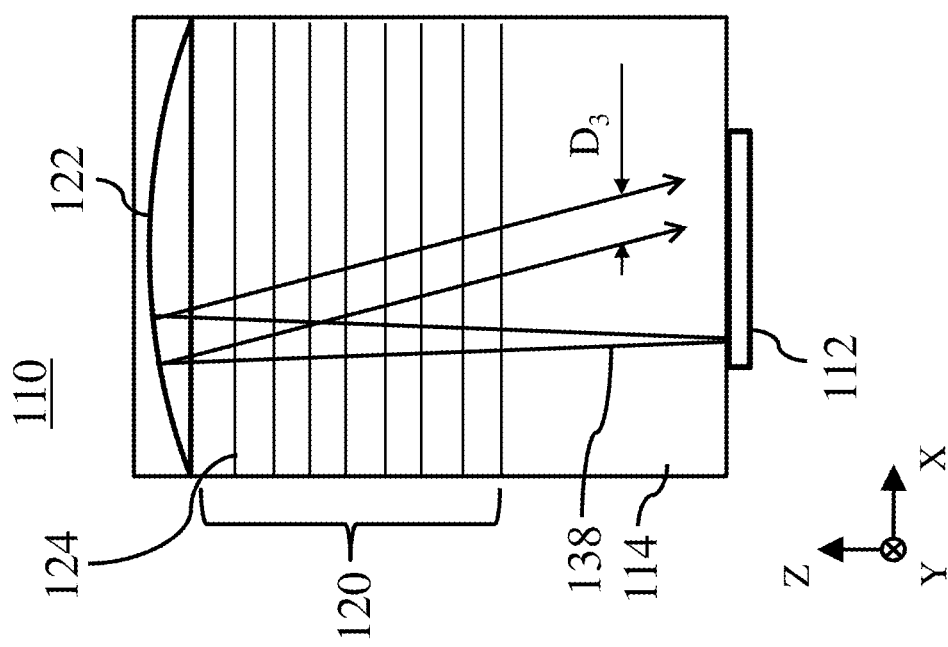
FIG. 8B is a diagram illustrating the beam of light of FIG. 8A being projected onto an eye according to an embodiment.

FIGS. 8A and 8B illustrate an example scenario using image projection assembly 110 according to an example embodiment where another part of the angular aperture of the POD 112 in the plane of the LOE 114 is illuminated by a beam 138. For example, the selective illumination system in the POD 112 may be utilized to illuminate only a portion of the angular aperture of the POD 112, in this example, the illuminated portion of the angular aperture is different than that shown in FIGS. 7A and 7B and illuminated by the beam 136. As with the beam 136, the angular aperture of the POD 112 in a plane normal to the plane of the major external surfaces 116 and 118 of the LOE 114 may be fully illuminated by the beam 138. The width of the collimated beam 138 after reflection from the reflective optical arrangement 122 is equal to $D_3$, which is smaller than the width DEP of the pupil 182, such that the collimated beam 138 only illuminates a portion of the pupil 182 as shown in FIG. 8B. The collimated beam 138 projects an image $J_3$ onto the retina 186 via the lens 184 of the eye 180. The image $J_3$ is projected on the retina 186 at a position that is different from the position of both of images $J_1$ and $J_2$, is blurred and has a size $s_3$ that is smaller than the size $s_1$ of the image $J_1$.

In each example scenario, the positions $J_1$, $J_2$ and $J_3$ of the projected images on the retina 186 may be defined as a centroid of the illuminated location. In this manner, the positions $J_1$, $J_2$ and $J_3$ of the projected images in FIGS. 6A-8B are considered to be different even if a portion of one or more of the projected images may overlap on the retina 186.

FIGS. 9A-9C illustrate optical aberration plots for an optical system 100 having a reflective optical arrangement 122 such as, e.g., a cylinder mirror, at the end of the LOE 114 according to each of the example scenarios described above for FIGS. 6A through 8B. In FIGS. 9A-9C, the axis px refers to the pupil coordinate axis and coincides with the axis X in FIGS. 6A through 8B, the axis ey refers to the transverse ray error as a function of the pupil entrance radius, ac, bc and cc refer to the aberration that results from the reflective optical arrangement 122, af refers to the width of the beam with a fully illuminated angular aperture, and bf and cf refer to sub-aperture widths of the POD 112.

FIG. 9A illustrates an aberration plot of the example scenario of FIGS. 6A and 6B with the beam 134 illuminating the full area of the pupil 182. As seen in FIG. 9A, the aberration ac resulting from the reflective optical arrangement 122 is relatively large as compared to those found in FIGS. 9B and 9C.

FIG. 9B illustrates an aberration plot of the example scenario of FIGS. 7A and 7B with the beam 136 illuminating a first portion of the pupil 182. As seen in FIG. 9B, aberration bc forms a first dashed rectangle on the aberration plot is smaller than the aberration ac that resulted from full illumination of the pupil 182.

FIG. 9C illustrates an aberration plot of the example scenario of FIGS. 8A and 8B with the beam 138 illuminating a second portion of the pupil 182. As seen in FIG. 9C, aberration cc forms a second dashed rectangle on the aberration plot that is smaller than the aberration ac that resulted from full illumination of the pupil 182. In addition, as seen in FIGS. 9B and 9C, the types of aberrations formed by the beams 136 and 138 are different where, for example, the beam 138 may have a reduced aberration cc that is due to the reflective optical arrangement 122 as compared to the aberration be of the beam 136.

Referring to FIGS. 10-15, example optical architectures and configurations of optical system 100 and POD 112 according to various embodiments will be described. POD 112 in each embodiment includes an illumination system 300, projection optics 302 and the SLM 304. The selective eye pupil illumination or selective EMB illumination in these embodiments is achieved by the illumination system 300 which may be utilized by the POD 112 as an image generator for the LOE 114 of the 2D expansion system (FIGS. 2A-2C) or for the LOE 214 of the 1D expansion system (FIG. 3). The projection optics 302 is configured to collimate the light beams coming from the pixels of SLM 304, so that each pixel generates a collimated beam, and collimated beams from different pixels propagate in different directions. The projection optics 302 are also configured to inject the collimated beams from each of the pixels into the LOE 114 or LOE 214. For example, in some embodiments, the projection optics 302 may include a single lens with the SLM 304 located in the focal plane of the lens. In other embodiments, the projection optics 302 may include one or more additional or alternative optical elements including, e.g., lenses, mirrors, waveplates, beamsplitter prisms or other optical elements.

Figure 10:
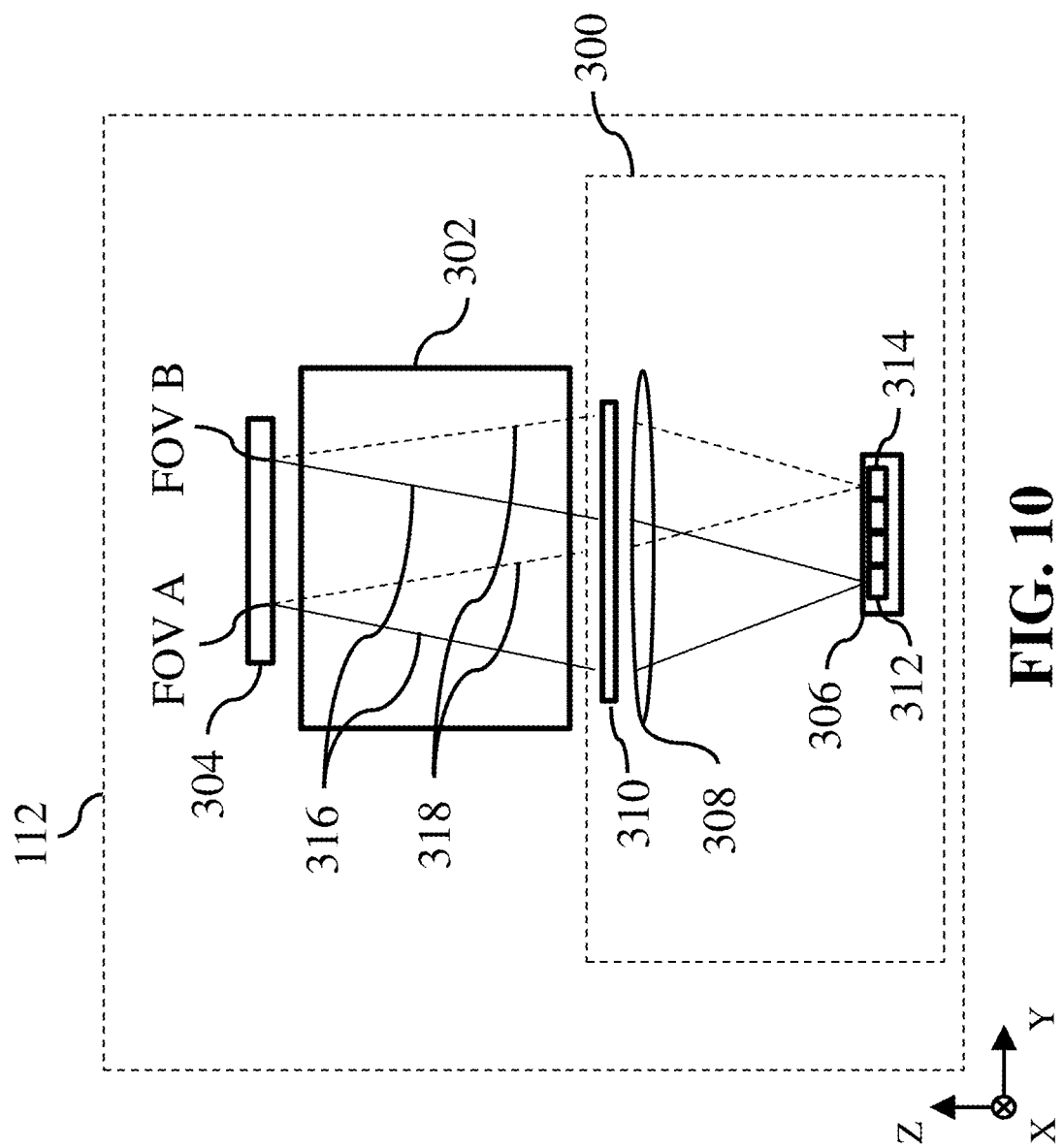
FIGS. 10 and 11 are schematic diagrams illustrating an example POD of the optical system of FIG. 1 according to an embodiment.
Figure 11:
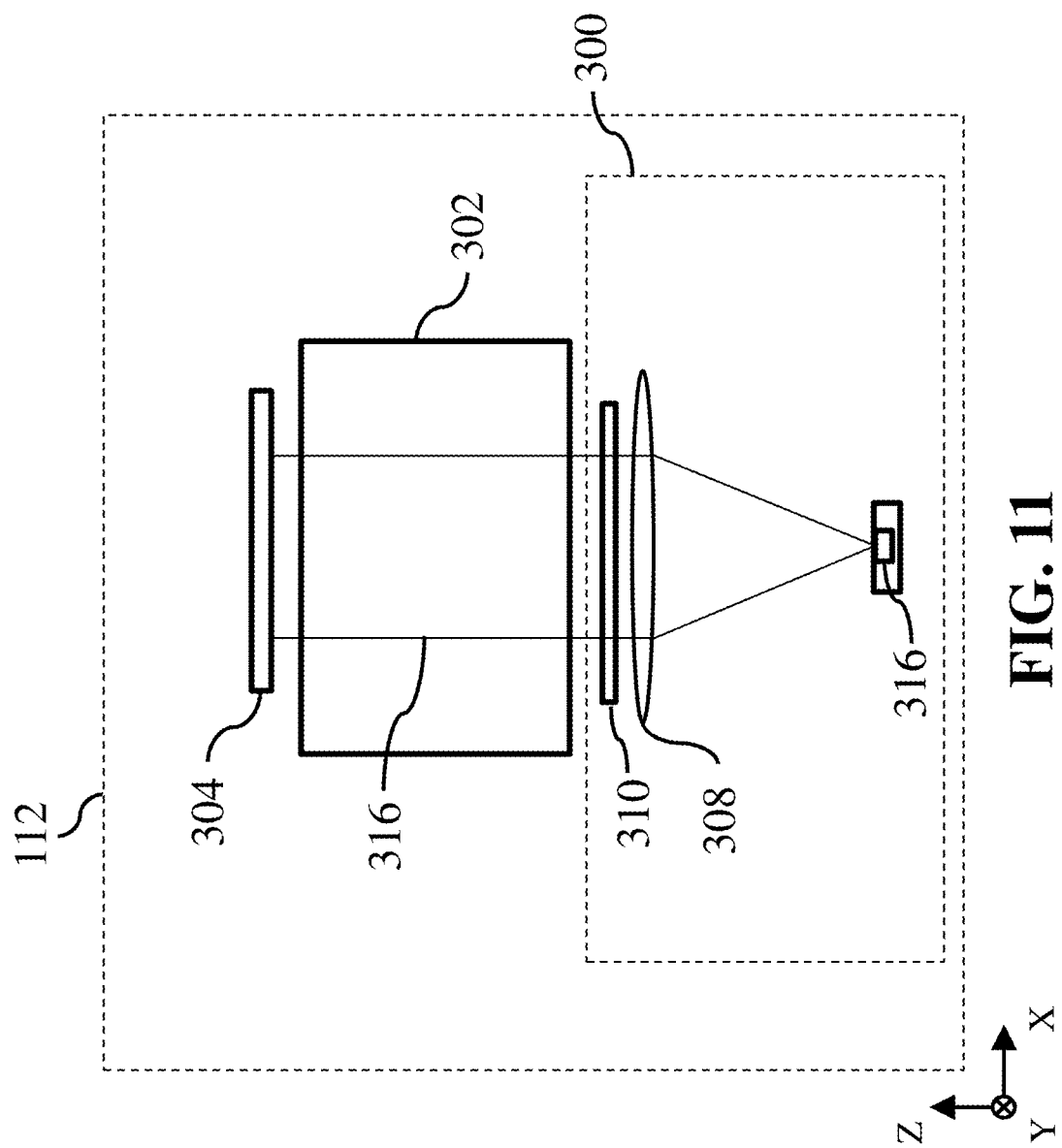

FIGS. 10 and 11 show an example configuration of the POD 112 in which selective eye pupil illumination or selective EMB illumination may be achieved according to an embodiment. In this embodiment, the illumination system 300 includes an array of light sources 306, e.g., LEDs or other selectively activatable light sources, located in the focal plane of an optical arrangement 308 such as a collimator lens. While optical arrangement 308 is described as a collimator lens, a wide range of lens types and implementations may be utilized including, but not limited to, spherical, aspherical or freeform refractive lenses formed from glass or plastic, diffractive lenses, Fresnel lenses, reflective lenses, and any combination of the above.

The array of light sources 306 may include red, green and blue light sources or multi-color light sources that are configured to generate red, green, blue or other colors. The light sources are configured to generate a color image in a color-sequential mode of operation of the SLM 304. While the array 306 is illustrated as having a particular number of light sources in FIGS. 10 and 11, the array 306 may alternatively include any other number of light sources. For example, additional light sources may be included in the array 306 to achieve smoother EMB scanning. In some embodiments, the aperture scanning may be performed in the YZ plane as shown in FIG. 10, while in the XZ plane the full aperture of the POD 112 may be illuminated as shown in FIG. 11. In some embodiments, the illumination system 300 may also include an optional diffuser 310 which expands the divergence of the light beams in the XZ plane as shown in FIG. 11. In other embodiments, a cylinder lens may be utilized in each of the light sources instead of the diffuser 310 to decrease the beam divergence in the XY plane.

The output light beam of each light source in the array 306 from the illumination system 300 is a collimated or almost collimated illumination that is provided to the SLM 304 via the projection optics 302. The angle of the collimated light beam at the SLM 304 is dependent on which light source in the array 306 is activated and a divergence of the illumination generated by the light source depends on the size of the light source and on the scatter angles range of the optional diffuser 310. Each light source in the array 306 corresponds to a different angular sub-aperture of the POD 112 where, for example, switching illumination between the angular sub-apertures of the POD 112 may be accomplished by switching on and off the respective light sources in the array 306. As shown in FIG. 10, for example, light sources 312 and 314 generate light beams 316 and 318 respectively that are provided to SLM 304 after they are collimated by optical arrangement 308 and optionally scattered by the diffuser 310. As seen in FIG. 10, light beams 316 and 318 each illuminate the field of view (FOV) region between the FOV A and FOV B of the POD 112.

Figure 12:
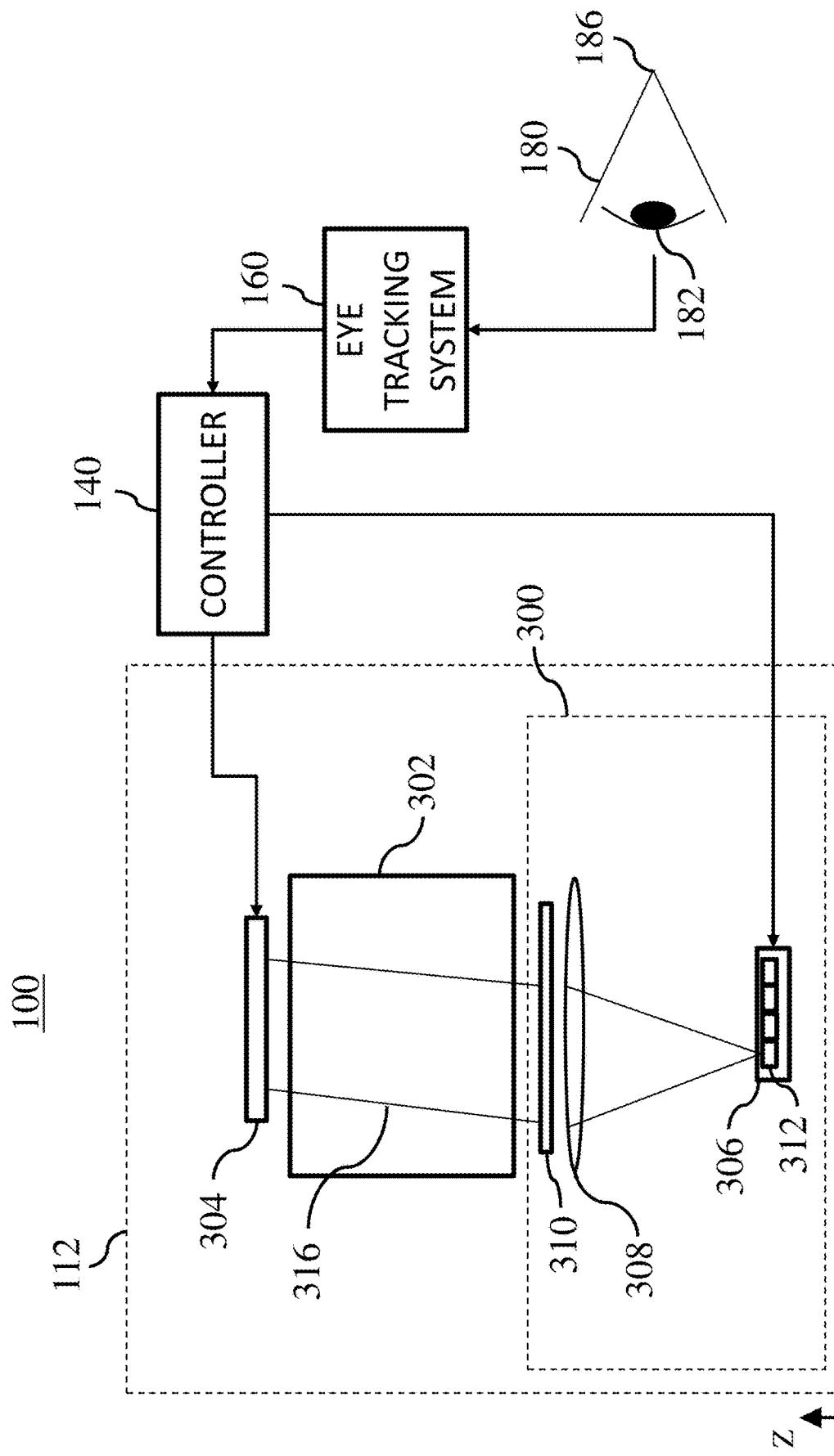
FIG. 12 is a schematic diagram illustrating the optical system of FIG. 1 with the controller controlling a spatial light modulator (SLM) of the POD of FIGS. 10 and 11 according to an embodiment.

FIG. 12 shows an example embodiment of the optical system 100 using the example configuration of the POD 112 described above for FIGS. 10 and 11. The eye tracking system 160 is configured to measure a location of the pupil 182 of the eye 180 relative to the LOE 114 and to provide this measured location to the controller 140 as location information. The controller 140 is configured to determine a light source in the array 306 that may be switched on or otherwise activated to illuminate the aperture that will project an image onto the pupil 182 or onto a sub-aperture of the pupil 182 at the measured location based on the location information. In some embodiments, the controller 140 is also configured to calculate or determine any distortions to be applied to the image that is provided to the SLM 304 to compensate the image for any aberrations caused by the POD 112 and the reflective optical arrangement 122 or other components of the LOE 114.

The distortions applied to the image provided to the SLM 304 may, for example, depend on which light source in the array 306 is activated, the location of the pupil 182, which portion of the EMB is being illuminated or on any other criteria. The position of the image on the retina 186 for the same FOV may be different, e.g., depending on which sub-aperture is observed by the pupil 182, for example as seen in FIGS. 7A to 8B. Because the position of the projected image on the retina is different for each sub-aperture, the type and amount of distortion applied by the controller 140 to the image at the SLM 304 may depend on which sub-aperture or corresponding light source of the POD 112 is activated. By applying distortions to the image based on which sub-aperture or light source is activated, and in some embodiments according to the location on the retina 186 where the image will be projected, the image projected onto the retina 186 from each sub-aperture or light source may be aligned such that the user sees the same or approximately the same image regardless of which sub-aperture or light source is activated to provide the image. For example, the control of the SLM 304 and the array of light sources 306 may be synchronized by the controller 140 to enable fast switching between the light sources based on the location of the pupil 182 as tracked by the eye tracking system 160. By synchronizing control of the SLM 304 and the array of light sources 306, images may be projected that are corrected for aberrations regardless of changes in the location of the pupil 182 or corresponding changes in which light source is activated by the controller 140.

With reference now to FIGS. 13A-13D, an example process for determining the image distortion to be applied to the light beams by the SLM 304 based on which light sources of the array 306 are activated will now be described. The example process may be utilized for a single FOV point or for a small local area of the FOV.

Figure 13C:
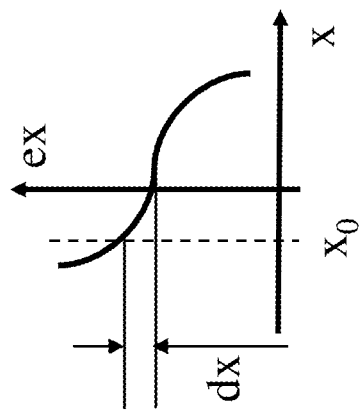
FIGS. 13B and 13C are diagrams illustrating example aberration plots according to the example process of FIG. 13A according to an embodiment.
Figure 13B:
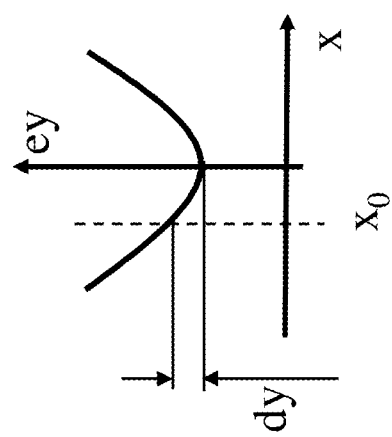
Figure 13A:
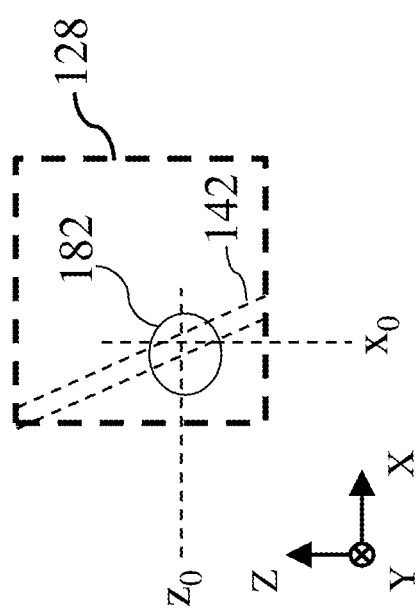
FIG. 13A is a diagram illustrating an example process for partial eye pupil illumination and selective eye motion box (EMB) illumination according to an embodiment.
Figure 13D:
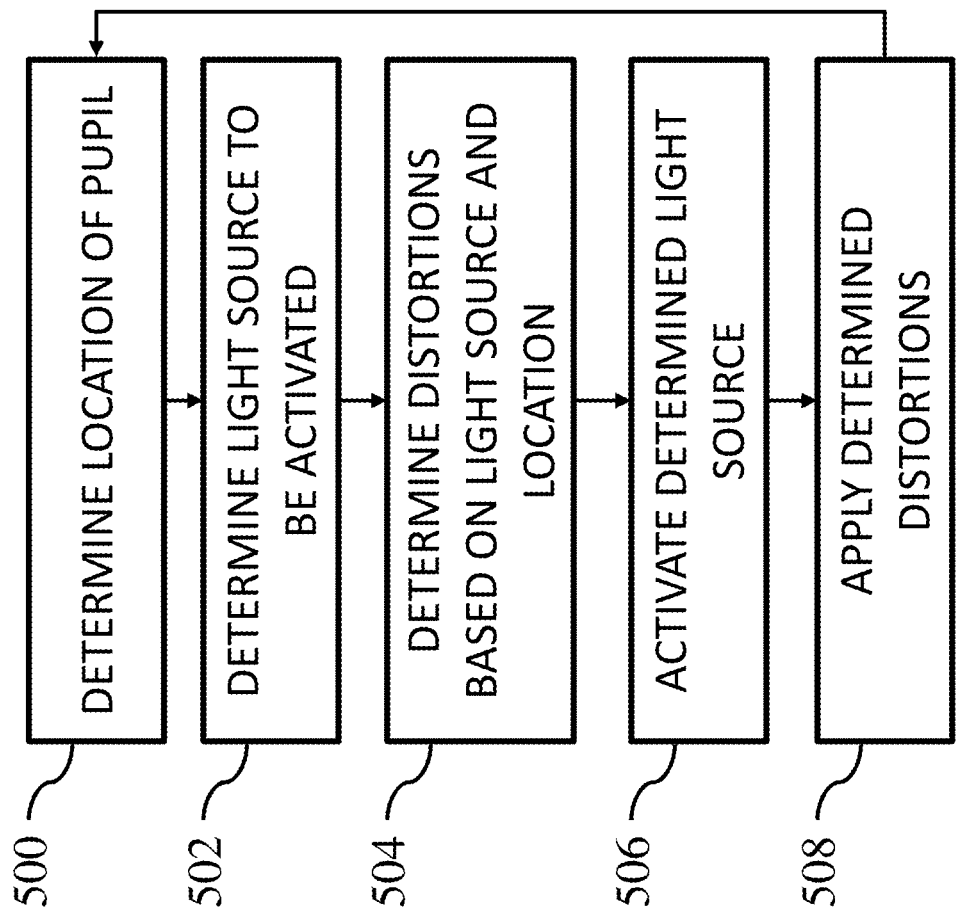
FIG. 13D is a flow diagram of the example process of FIG. 13A according to an embodiment.

With reference to FIG. 13D, an example process for operating the optical system 100 will now be described. The process may be performed at least in part by the controller 140, eye tracking system 160 and POD 112 or may be performed at least in part by other portions of optical system 100. The process of FIG. 13D includes steps 500 through 508. While the process of FIG. 13D is described herein as having particular steps or a particular order of steps, the process may alternatively perform the steps in any order, may include additional steps, may include fewer steps or may only perform a portion of the steps described below in other embodiments.

At step 500, eye tracking system 160 locates the position of the pupil 182 inside the EMB 128, for example, as shown in FIG. 13A. As an example, eye tracking system 160 may utilize one or more eye tracking cameras or other optical element to locate the position of the pupil 182. The eye tracking system 160 provides location information corresponding to the determined location, e.g., coordinates or other information, to the controller 140.

At step 502, controller 140 determines a light source in the array 306 that may be activated to project an image onto a portion of the pupil 182. For example, controller 140 may maintain a coordinate map of the EMB 128 that indicates which light source corresponds to each portion of the EMB 128. The controller 140 may select the light source to be activated based at least in part on a comparison between the location information and the coordinate map, e.g., by determining the location of the pupil 182 relative to the EMB 128 and identifying the corresponding light source based on the coordinate map. In some embodiments, controller 140 is configured to identify, for each light source from the light source array 306, which area of the EMB 128 will be illuminated for each FOV point or a small FOV local region. Given the location of the pupil 182 and the FOV point to be projected, the controller 140 can identify the light source to be turned on. As seen in FIG. 13A, for example, such a light source generates a beam 142 which illuminates an area crossing the pupil 182. In FIG. 13A, the coordinates ($x_0$, $z_0$) correspond to the center of the illuminated area inside the pupil 182.

At step 504, controller 140 determines which distortions to apply to the image at the SLM 304 based at least in part on the selected light source. In some embodiments, the distortions may also or alternatively be determined based at least in part on the location information, e.g., in a case where multiple light sources may be utilized to illuminate the same location but with light beams having different collimated angles.

FIGS. 13B and 13C show aberration curves, similar to the curves shown in FIGS. 9A-9C, for an optical system 100 having a reflective optical arrangement 122. The aberration curves in FIGS. 13A and 13B show the position ex and cy of the rays corresponding to a given FOV point at the retina 186 of the user depending on the position of the rays at the exit pupil, e.g., EMB 128, along x-axis. Assuming that the nominal image corresponds to the rays passing through the center of the exit pupil, the distances dy and dx in FIGS. 13B and 13C give the local displacements of the image along the y axis and x axis respectively. The distortions equal to dx and dy can be applied to the image projected through the sub-aperture defined by the intersection of the beam 142 with the pupil 182.

In some embodiments, the controller 140 may determine the distortions to be applied, for example, using a lookup table that has pre-defined distortion values based on the target location and light source to be activated. For example, the lookup table may be generated using a variety of techniques including, e.g., using the inverse method to adjust the distortions based on the resulting image as projected on the eye 180 or a representation of the eye, by simulating or modeling the aberrations and potential distortions or in any other manner. In some embodiments, the illuminated beam aperture may be slightly different for each of the RGB light sources. In such a case, the controller 140 may also take these differences into account when applying distortions to the red, green and blue images to correct for such small differences in the apertures and to correct possible chromatic distortions of the projection optics, e.g., lateral color.

At step 506, controller 140 activates the selected light source to output the image.

At step 508, controller 140 provides the SLM 304 with the determined distortions to be applied to the image before providing the image to the LOE 114. The image is then projected onto a portion of the pupil 182 by the LOE 114 and the process returns to step 500 and continues for each frame of the image. In this manner, changes to the location of the pupil 182 are taken into account, corresponding light sources are activated, and appropriate distortions are applied to generate an image with as few distortions as possible.

In some embodiments, controller 140 is configured to activate each light source in the array 306 sequentially to perform a full EMB scan where a distortion may be determined and applied to the image at the SLM 304 for each light source. As an example, in a case where the eye tracking system 160 is not present or active and the location of the pupil 182 is not known, such a sequential activation may be utilized to rapidly present images to each portion of the EMB 128 and ensure that at least one distortion corrected image is projected onto the location of the pupil 182.

Figure 14:
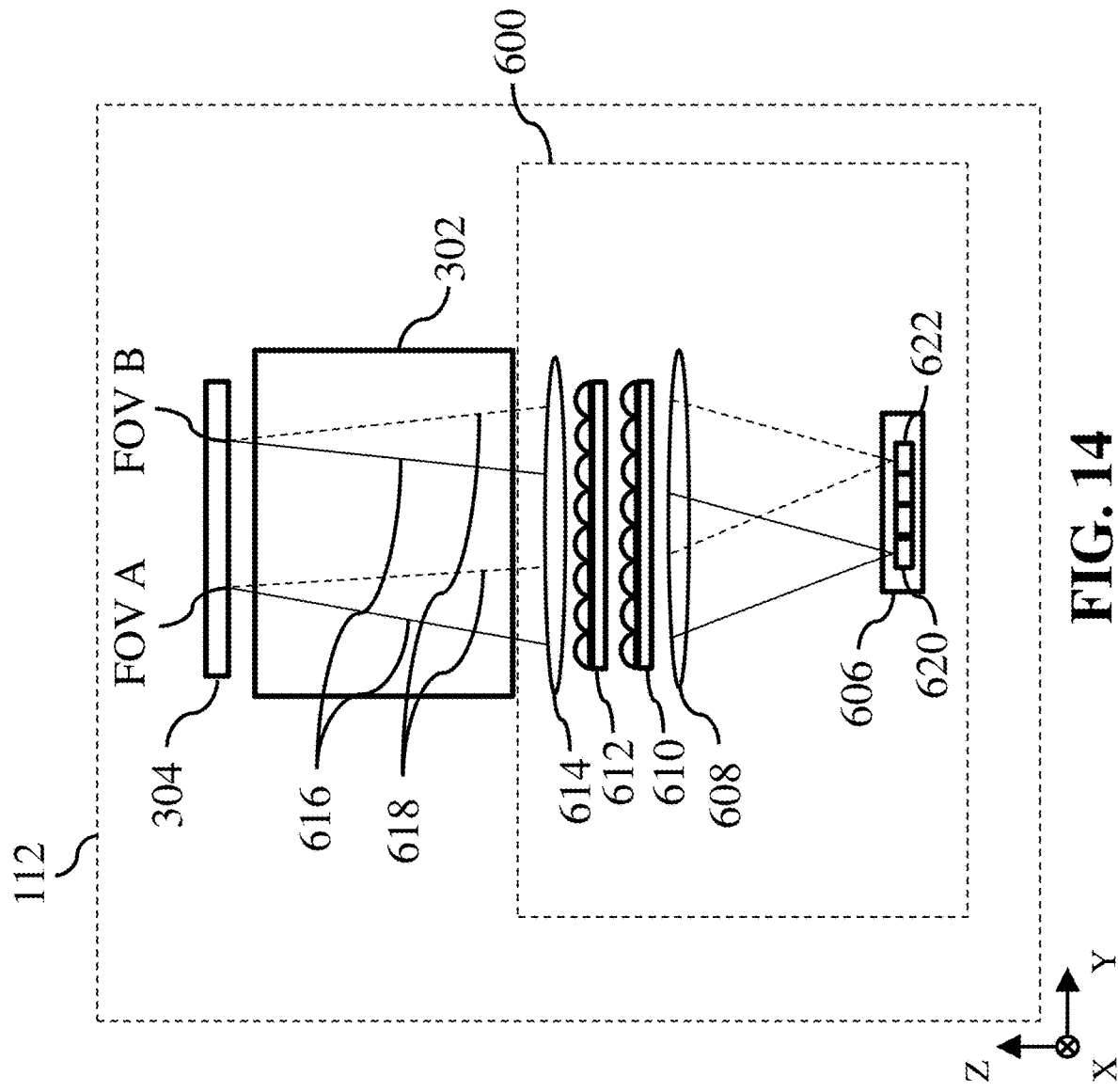
FIGS. 14 and 15 are schematic diagrams illustrating an example POD of the optical system of FIG. 1 having micro-lens arrays (MLAs) according to an embodiment.
Figure 15:
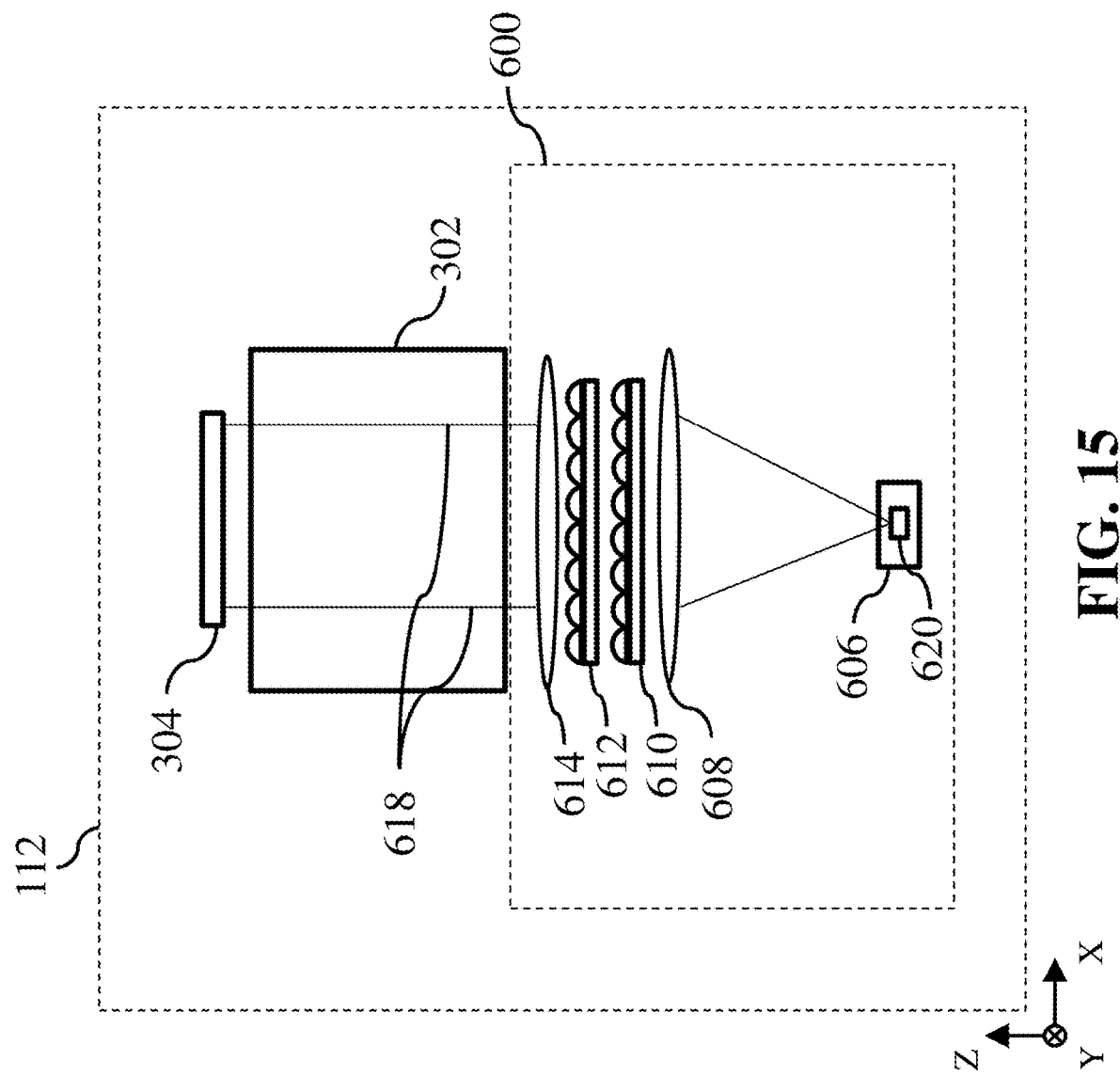

FIGS. 14 and 15 show an example configuration of the POD 112 in which selective eye pupil illumination or selective EMB illumination may be achieved according to another embodiment. In this embodiment, an illumination system 600 replaces the illumination system 300 in the POD 112. The illumination system 600 includes an array of light sources 606 similar to the array of light sources 306, a first optical arrangement 608, a first micro-lens array (MLA) 610, a second micro-lens array 612 and a second optical arrangement 614.

First and second optical arrangements 608 and 614 may include lenses such as, e.g., Fresnel lenses or diffractive lenses that may be used to collimate light beams of an image. While first and second optical arrangements 608 and 614 are described above as including particular types of lenses or optical components, a wide range of other lens types or optical components and implementations may alternatively be utilized including, but not limited to, spherical, aspherical or freeform refractive lenses formed from glass or plastic, diffractive lenses, Fresnel lenses, reflective lenses, and any combination of the above.

The first and second MLAs 610 and 612 each include an array of lenses that may function as a single element. In some embodiments, the lenses of the first and second MLAs 610 and 612 may include refractive lenses. In some embodiments, a baffle arrangement (not shown) may be interposed between the first and second MLAs 610 and 612 to reduce crosstalk between the collimating optics. While the first and second MLAs 610 and 612 are described above as including particular types of lenses or optical components, a wide range of other lens types or optical components and implementations may be utilized including, but not limited to, spherical, aspherical or freeform refractive lenses formed from glass or plastic, diffractive lenses, Fresnel lenses, reflective lenses, and any combination of the above.

The first optical arrangement 608 and each of the lenses in the first MLA 610 are together configured to create an image of the light sources of the array 606 at the plane of the second MLA 612. The second MLA 612 and the second optical arrangement 614 are together configured to create an image of each of the lenslet elements of the first MLA 610 at the plane of the SLM 304. In an example configuration, the array of light sources 606 is located in the focal plane of the optical arrangement 608, the second MLA 612 is located in the focal plane of the first MLA 610 and the SLM 304 is located in the focal plane of the optical arrangement 614. The selective illumination of the EMB 128 is achieved by switching on and off the light sources in the array 606 in a coordinated and timed fashion so that only a target portion of the EMB 128 and corresponding portion of the pupil 182 are illuminated. For example, as seen in FIGS. 14 and 15, light beams 616 and 618 of an image may be generated by selectively activating light sources 620 and 622, e.g., at different times. The light beams 616 and 618 travel through the first optical arrangement 608, through one or more lenses of the first MLA 610, through one or more lenses of the second MLA 612, and through the second optical arrangement 614 and are output from the illumination system 600 to FOV A and FOV B of the SLM 304 via the projection optics 302 as collimated beams. The SLM 304 then applies a distortion to the images of the light beams 616 and 618 and outputs them to the LOE 114 for projection to the pupil 182 in a similar manner to that described above for the process of FIG. 13.

Figure 16A:
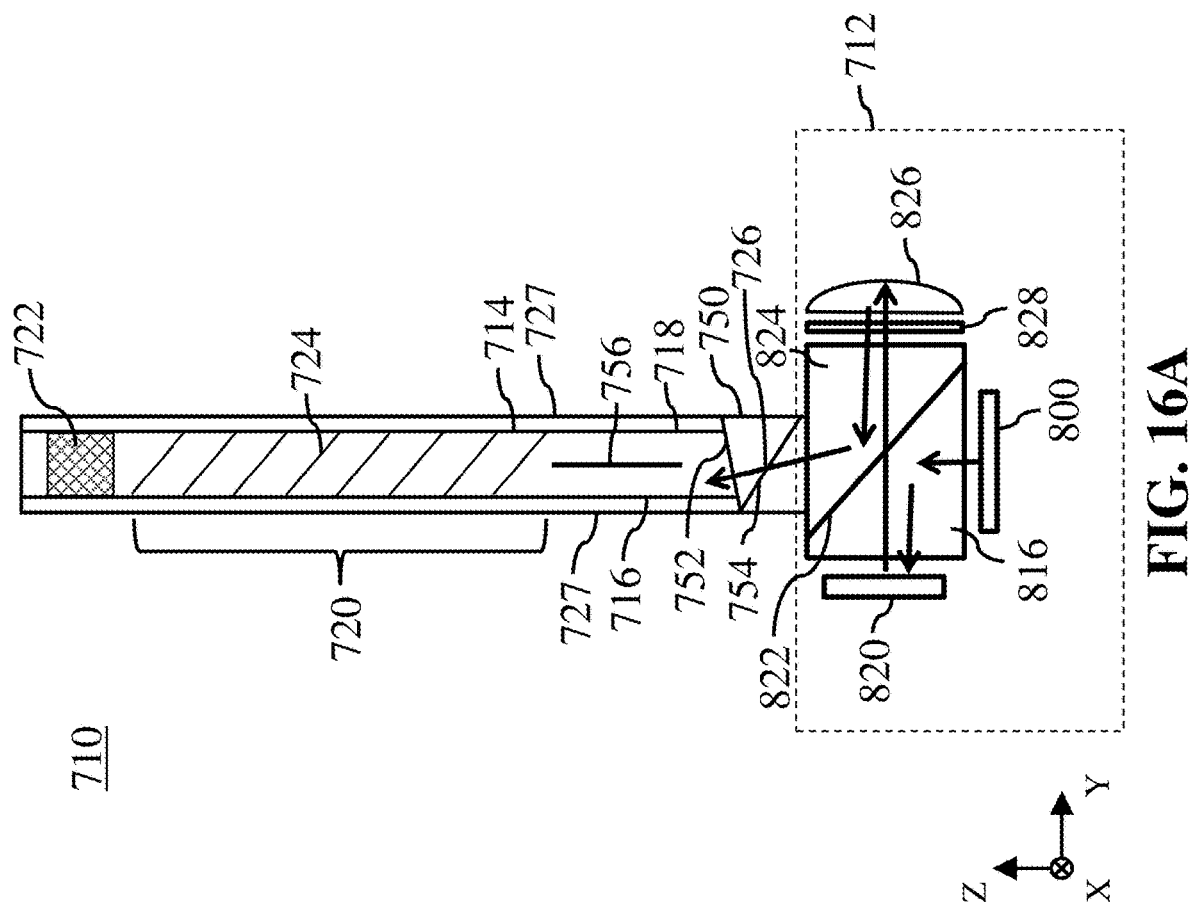
FIGS. 16A and 16B are schematic diagrams illustrating an example image projection assembly of the optical system of FIG. 1 according to an embodiment.
Figure 16B:
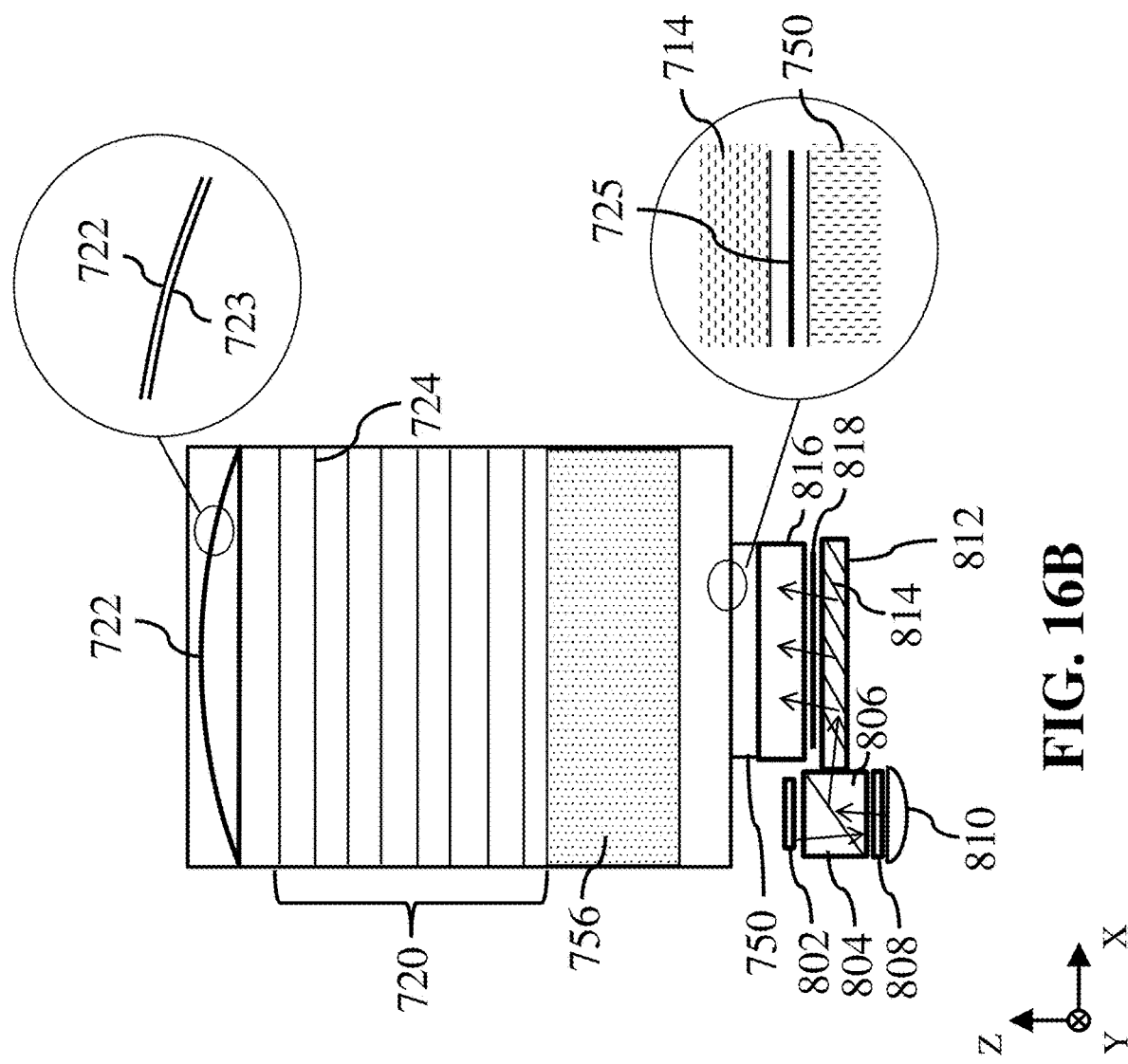

With reference to FIGS. 16A and 16B, schematic views in the YZ and XZ planes, respectively, of an image projection assembly 710 according to some embodiments will now be described. The image projection assembly 710 may include components similar to those described above for the image projection assembly 110 where such components have similar reference numbers. For example, image projection assembly 710 includes a POD 712 and an LOE 714. The LOE 714 includes major external surfaces 716 and 718, a coupling-out arrangement 720 including, e.g., facets 724, and a reflective optical arrangement 722 that are similar to the components of the LOE 114.

The image projection assembly 710 further includes a wedge 750 positioned between the POD 712 and the LOE 714. The wedge 750 is configured to reduce aberrations of the cylinder mirror that are illustrated in FIGS. 9A-9C. The light beams 726 are coupled from the POD 712 into the LOE 714 via the wedge 750, and the waveguide aperture stop is located behind the wedge 750. In some embodiments, the surfaces 752 and 754 of the wedge 750 may optionally have optical power in one or two dimensions to compensate for optical aberrations of the POD 712 and to improve image quality. The LOE 714 further includes a mixer 756, e.g., a semi-reflective plane that is parallel to the major external surfaces 716 and 718. In some scenarios, for example, the output beam 726 of the POD 712 may not fill the LOE 714 completely. The mixer 756 is utilized to distribute the beam 726 over the full aperture of the LOE 714. In some embodiments, the mixer 756 may be located inside the LOE 714 between the wedge 750 and the coupling-out arrangement 720, e.g., as shown in FIG. 16A. In other embodiments, the mixer 756 may be located inside the LOE 714 between the coupling-out arrangement 720 and the reflective optical arrangement 722. The reflective optical arrangement 722 may also include a waveplate 723 disposed between the coupling-out arrangement 720 and the reflective optical arrangement 722, e.g., a quarter waveplate. In the embodiment where the mixer 756 is located between the coupling-out arrangement 720 and the reflective optical arrangement 722, the light beam will pass through the mixer 756 twice before being directed from the LOE 714 toward the EMB or pupil by the coupling-out arrangement 720. In such a case, the mixer 756 may have a shorter length along the z-direction as compared to the embodiment where the mixer 756 is located between the wedge 750 and the coupling-out arrangement 720.

The image projection assembly 710 may further include a polarizer 725 disposed between the LOE 714 and the wedge 750. In some embodiments, the coupling-out arrangement 720 includes surfaces, e.g., the facets 724, that are partially reflective for one polarization, e.g., polarization(s), but essentially transparent for an orthogonal polarization, e.g., polarization (p). If the input light beams 726 that are output from the POD 712 is p-polarized, it will propagate towards the reflective optical arrangement 722 without being coupled-out by the coupling-out arrangement 720. After reflection from the reflective optical arrangement 722 and passing through the waveplate 723, the light becomes s-polarized and is coupled-out from the LOE 714 by the coupling-out arrangement 720 when propagating from the reflective optical arrangement 722 back towards the POD 712. The polarizer 725 is configured to inhibit the back-propagated light beam from entering the POD 712.

In some embodiments, the LOE 714 may also include optional cover plates 727 that are disposed on the major external surfaces 716 and 718 of the LOE 714. The cover plates 727 result in the thickness of the coupling-out arrangement 720 in the direction normal to the waveguide major surfaces being smaller than the total thickness of the LOE 714. The LOE 714 may also include optional polarizers (not shown) that are disposed parallel to the major external surfaces 716 and 718 of the LOE 714 that are configured to inhibit the passage of p-polarized light. For example, such an optional polarizer (not shown) may be disposed in front of the LOE 714, e.g., on the left side of the LOE 714 in FIG. 16A, that is configured to inhibit a light beam that is coupled-out by the coupling-out arrangement 720 from the LOE 714 to the outside world. Another optional polarizer (not shown) may be disposed behind the LOE 714, e.g., on the right side of the LOE 714 in FIG. 16A, that is configured to inhibit a light beam that was coupled-out by the coupling-out arrangement 720 and was reflected by the left major external surface 716 towards the user.

An illumination system 800 of the POD 712 is shown schematically in FIG. 16A and is shown in more detail in FIG. 16B. The illumination system 800 includes an array of light sources 802, a polarization beam-splitter disposed in between an arrangement of prisms 804 and 806, a quarter waveplate 808 and a collimating optical arrangement 810, e.g., a reflective lens or mirror. The light beams emitted by the light sources in the array 802 become collimated after reflection from the optical arrangement 810 and are injected into an LOE 812, e.g., a waveguide, which has two major planar parallel surfaces and a set of semi-reflecting facets 814 for light extraction towards the prism 816 of the POD 712. The POD 712 may also include an optional diffuser 818 between the LOE 812 and the prism 816 of the POD 712. The illumination system 800 may also include an optional diffuser (not shown) between the prisms 804 and 806 and the LOE 812. The light beams coupled-out from the prisms 804 and 806 to the LOE 812 propagate through the LOE 812 by means of total internal reflection and are coupled-out from the LOE 812 by the facets 814 toward the optional diffuser 818 and the prism 816 of the POD 712. Example paths of the propagation of the light beams in the illumination system 800 are shown as arrows in FIG. 16B.

As shown in FIG. 16A, the light beams received from the illumination system 800 enter the prism 816 and are redirected toward an SLM 820. A polarization beam-splitter 822 may be disposed between the prism 816 and another prism 824 of the POD 712. The SLM 820 may be similar to the SLM 304 and is configured to be controlled by the controller 140. In this embodiment, the SLM 820 may be implemented as a reflective SLM or a light emitting SLM as described above with reference to the SLM 304.

The illumination light beams are modulated by the SLM 820, for example, in a similar manner to that described above for the SLM 304, and are directed towards a reflective optical arrangement 826 of the POD 712 through the polarization beam-splitter 822 and prism 824. Light beams reflected by the reflective optical arrangement 826 are then directed toward the wedge 750 by the prism 824.

Figure 16C:
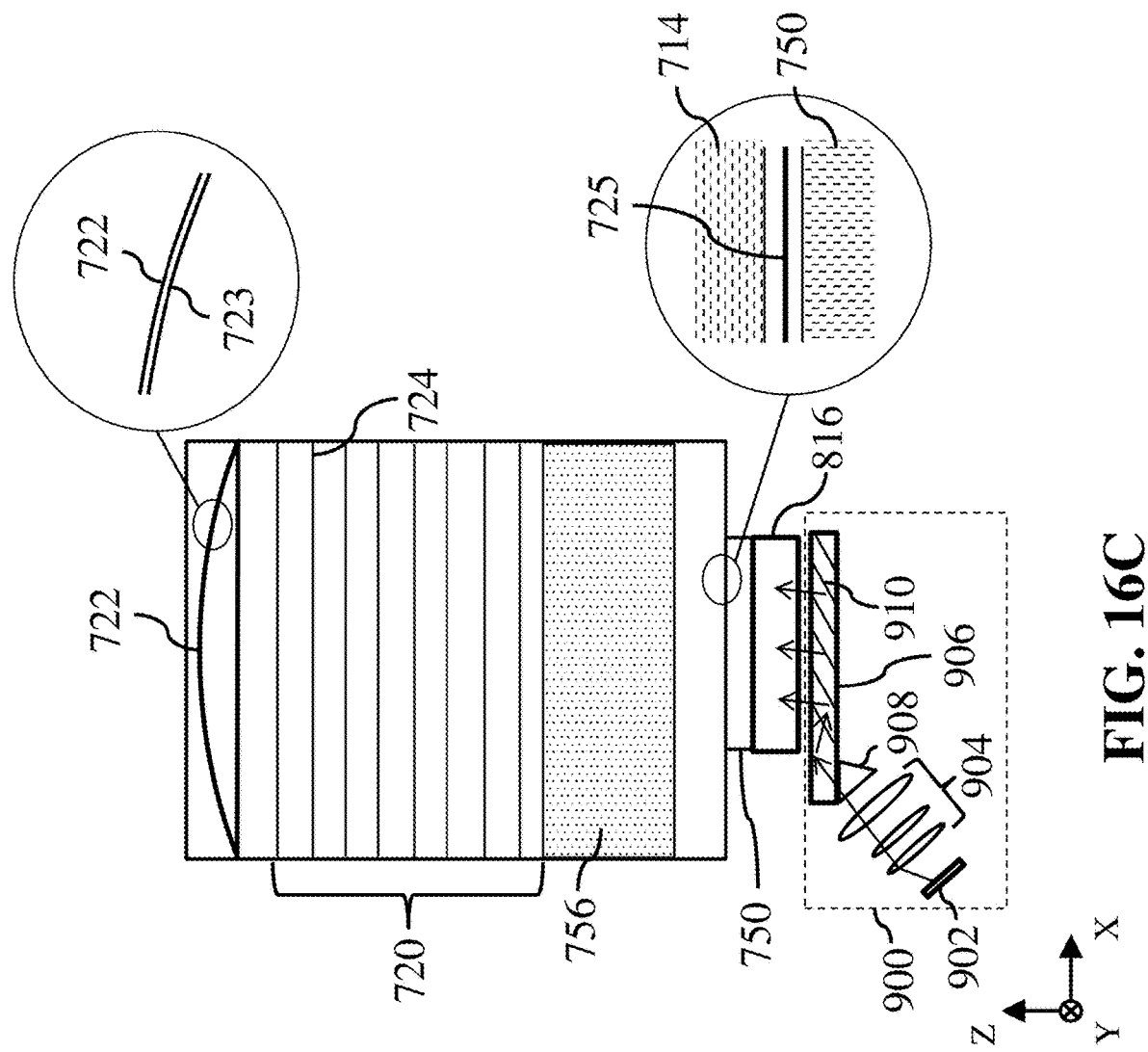
FIG. 16C is a schematic diagram illustrating an example image projection assembly of the optical system of FIG. 1 according to an embodiment.
Figure 17:
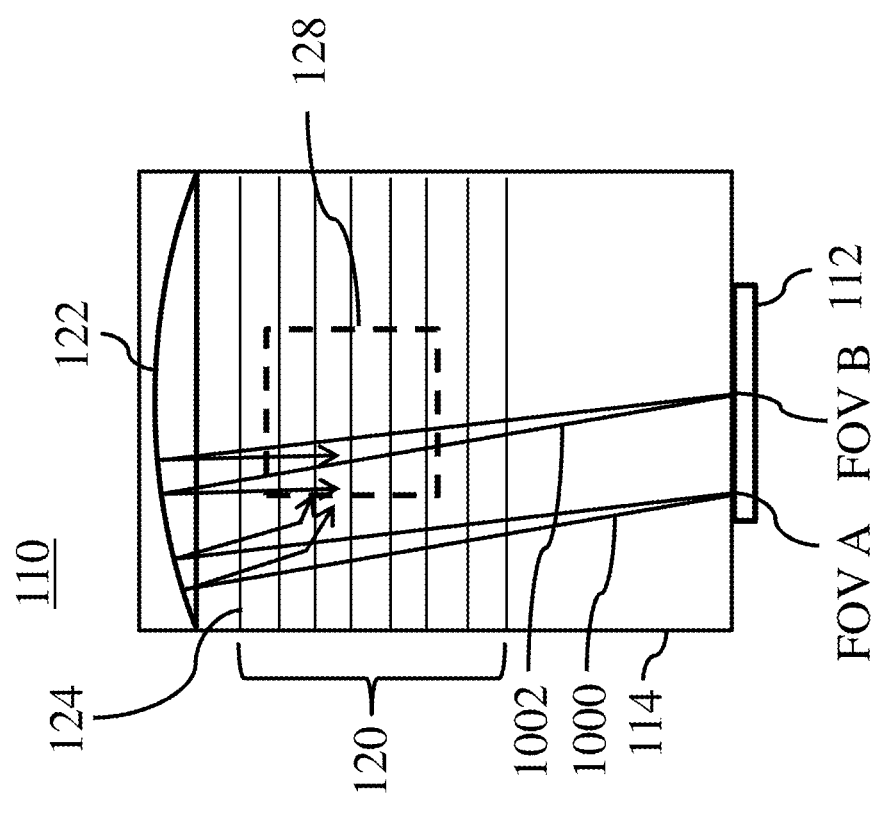
FIG. 17 is a schematic diagram illustrating light beams projected by the POD of FIG. 10 into a light-guide optical element (LOE) of the optical system of FIG. 1 and directed to an EMB according to an embodiment.

FIG. 16C illustrates an illumination system 900 that may be used with the POD 712 and the LOE 714 according to another embodiment. The illumination system 900 replaces the illumination system 800 of FIG. 16B in this embodiment. The illumination system 900 includes an array of light sources 902 and an imaging system including optical elements 904. The optical elements 904 may include refractive lenses, Fresnel lenses, diffractive or phase lenses, e.g., Pancharatnam-Berry lenses, or any other types of lenses in any combination. The light beams emitted by the sources in the array 902 are collimated after passing through the optical elements 904 and are injected into the LOE 906 through a prism 908. The light propagates in the LOE 906 by means of total internal reflection and is directed into the prism 816 of the POD 712 by the semi-reflecting facets 910. The light propagation paths in the illumination system 900 are shown by arrows in FIG. 16C. Similar to illumination system 800, optional diffusers (not shown) may also be included, e.g., between the LOE 906 and the prism 816 and between the optical elements 904 and the prism 908.

FIG. 17 and FIGS. 18A-18C illustrate an embodiment of image projection assembly 110 in which two pixels of the SLM 304 (FIG. 10) reflect the light beams from the illumination system 300 (FIG. 10) into two light beams 1000 and 1002. The beams 1000 and 1002 correspond to the two different points in the FOV, FOV A and FOV B respectively, but also correspond to the same angular sub-aperture of the POD 112 as defined by the active illumination system source. The beams 1000 and 1002 are expanded by the facets 124 of the coupling-out arrangement 120 and projected onto the EMB 128.

Figure 18C:
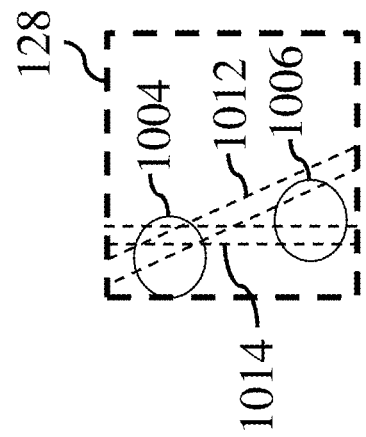
FIGS. 18A-18C are diagrams illustrating the paths of the light beams from different apertures and different fields of view (FOVs) of the POD of FIG. 10 relative to a location of a pupil of the eye according to an embodiment.
Figure 18B:
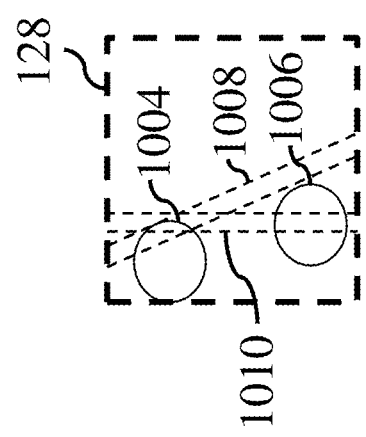
Figure 18A:
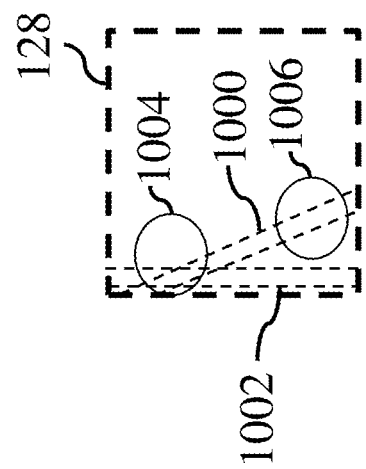

FIGS. 18A-18C illustrate example scenarios in which beams 1000 and 1002 of different FOVs are projected onto the EMB 128 and the pupil 182 (FIG. 6B) of the eye 180 (FIG. 6B). In FIGS. 18A-18C, the beams 1000 and 1002 are illustrated as dashed lines and the positions of the pupil 182 are illustrated as circles.

With reference to FIG. 18A, an example scenario is described in which two possible positions 1004 and 1006 of the pupil are shown. In position 1004, both beams 1000 and 1002 illuminate the pupil, showing FOV A and FOV B to the user. In position 1006, only beam 1000 illuminates the pupil, showing only FOV A to the user. The example scenario of FIG. 18A shows that different sub-apertures of the POD 112 may be illuminated for a particular FOV to be visible to the pupil. For example, for FOV B to be visible to the pupil in position 1006, a different sub-aperture of the POD 112 may be illuminated.

With reference to FIG. 18B, another example scenario is described in which projections of light beams 1008 (FOV A) and 1010 (FOV B) at the EMB 128 are shown that correspond to a different sub-aperture of the POD 112 being illuminated. In this example scenario, the same two possible positions 1004 and 1006 of the pupil are shown. In position 1004, both beams 1008 and 1010 illuminate the pupil, showing both FOV A and FOV B to the user, though the beam 1008 illuminates the pupil 182 at position 1004 only partially. In position 1006, only beam 1010 illuminates the pupil, showing FOV B to the user. In order for FOV B to be visible to the pupil in position 1006, a different sub-aperture of the POD 112 may be illuminated.

In the example scenarios of both FIG. 18A and FIG. 18B, either FOV A or FOV B cannot be seen when the pupil is in position 1006. In some embodiments, the controller 140 (FIG. 1) is configured to account for this issue by sequentially turning on and off one or more light sources in the array 306 in a manner that ensures that the complete set of FOVs will be visible to the eye of the user when the pupil is located in a specific position on the EMB 128.

With reference to FIG. 18C, another example scenario is described in which projections of light beams 1012 (FOV A) and 1014 (FOV B) at the EMB 128 are shown that correspond to a different sub-aperture of the POD 112 being illuminated. In this example scenario, the same two possible positions 1004 and 1006 of the pupil are shown. In position 1004, both beams 1012 and 1014 illuminate the pupil, showing both FOV A and FOV B to the user. In position 1006, the full beam 1014 illuminates the pupil, showing FOV B to the user, but only part of beam 1012 illuminates the pupil. Such a partial illumination may result in a degradation of the image of the FOV A due to, for example, diffraction at the edge of the pupil. In some embodiments, the controller 140 may be configured to command the SLM 304 to project the FOV B but not project FOV A when illuminating this specific sub-aperture of the POD 112 while the pupil is in position 1006 in order to inhibit the projection of a degraded image of FOV A. Instead, FOV A may be projected on the same position 1006 by the sequential activation of another sub-aperture or light source of the POD 112.

Figure 19A:
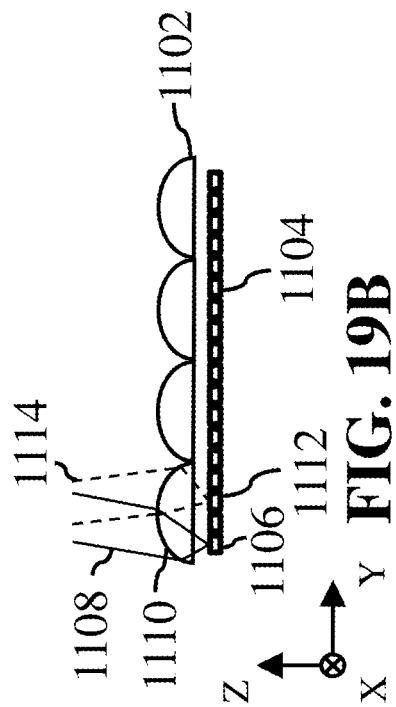
FIGS. 19A-19C are schematic diagrams illustrating a POD and illumination element of the optical system of FIG. 1 having an MLA according to an embodiment.
Figure 19B:
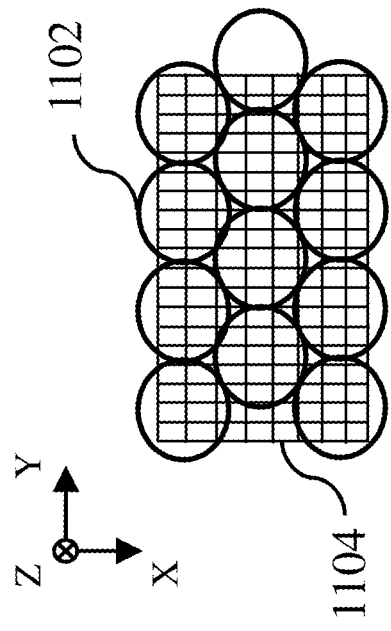
Figure 19C:
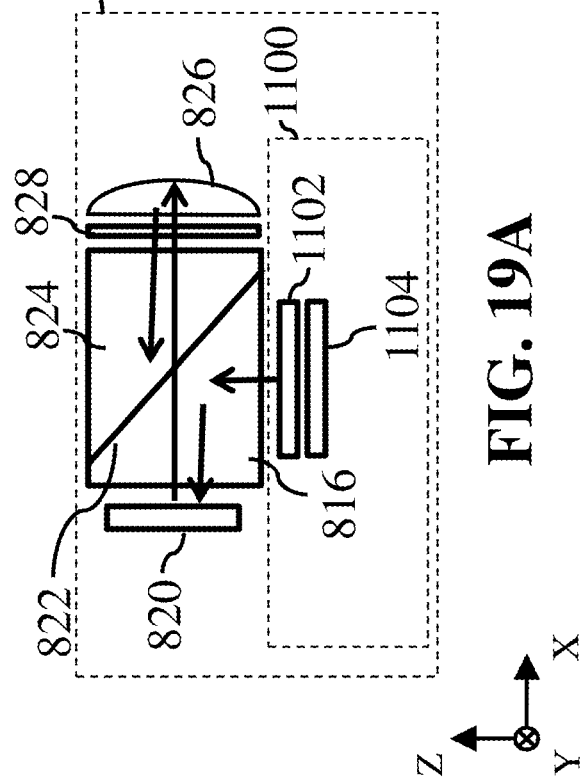

Referring to FIGS. 19A-19C, an illumination system 1100 according to another embodiment will now be described. The Illumination system 1100 may, for example, replace the illumination system 300 of POD 112 as shown in FIG. 10, replace the illumination system 600 of the POD 112 as shown in FIG. 14, replace the illumination system 800 of the POD 712 as shown in FIGS. 16A and 16B, replace the illumination system 900 of the POD 712 as shown in FIG. 16C or may be used with any other POD. The illumination system 1100 may include similar components to those found in any of the illumination systems 300, 600, 800 and 900.

In FIG. 19A, reference numerals corresponding to the POD 712 will be used with the description of the illumination system 1100. For example, as mentioned above, the POD 712 includes the prisms 816 and 824, the SLM 820, a polarization beam-splitter 822, a reflective optical arrangement 826 and an optional diffuser 828 all of which may function as described above with reference to FIGS. 16A and 16B after receiving a light beam from the illumination system 1100.

As shown in FIGS. 19A-19C, the illumination system 1100 includes an MLA 1102 and a matrix of light sources 1104 such as a micro-LED display or other arrangement of light sources. Light beams output from the illumination system 1100 are provided to the prism 816. As shown in FIG. 19B, each micro-lens in the MLA 1102 collimates the light from its respective light sources. The direction or angle of the collimated illumination can vary from micro-lens to micro-lens depending on which sources in the matrix 1104 are activated. For example, when a light source 1106 is activated, the light beam 1108 is collimated by micro-lens 1110 and output at a first direction or angle while when a light source 1112 is activated, the light beam 1114 is collimated by the same micro-lens 1110 but output at a second direction or angle that is different than the first direction or angle. The configuration of the MLA 1102 and matrix of light sources 1104 enables the controller 140 to present different angles of illumination for different areas of the SLM 820. In another embodiment, an array of micro-mirrors (not shown) may be utilized instead of the MLA 1102.

With reference now to FIGS. 20-29 embodiments are disclosed in which the various embodiments of optical system 100 described above may be configured for projection of a temporal-multiplexed light field image.

Figure 20:
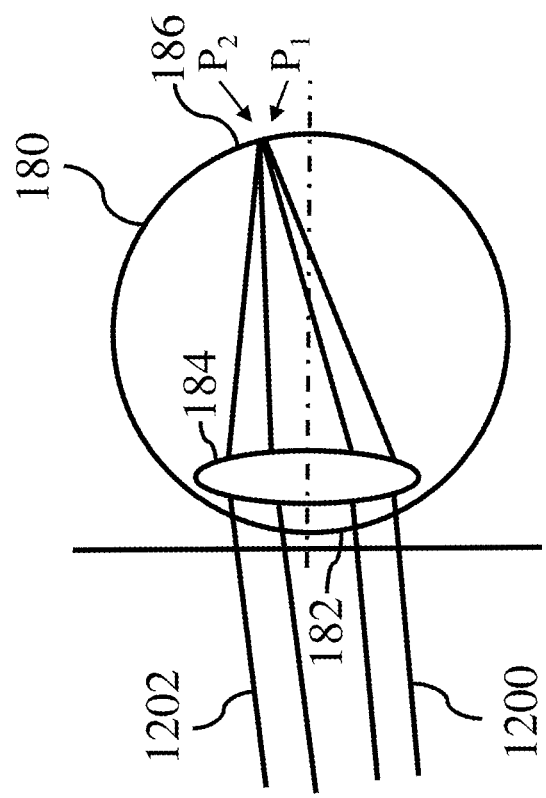
FIGS. 20 and 21 are diagrams illustrating the effect of an accommodation change in the eye on light beams projected onto the pupil according to an embodiment.
Figure 21:
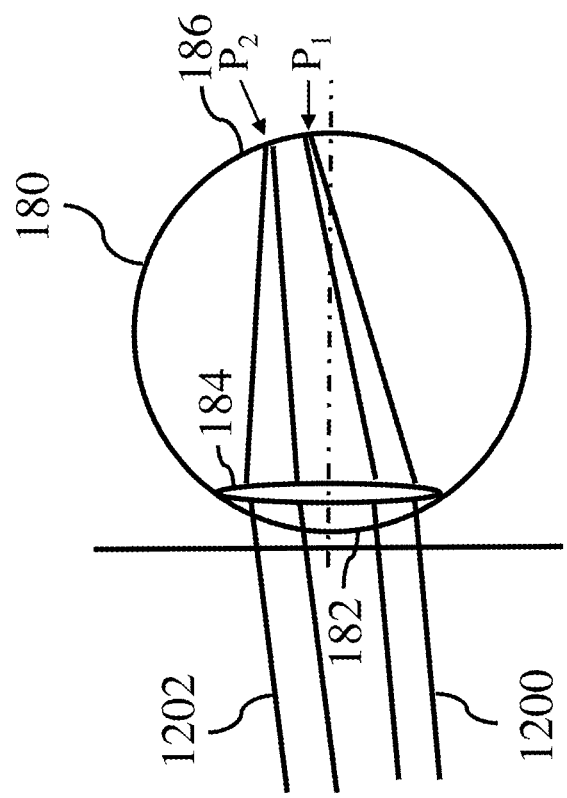

With reference to FIGS. 20 and 21, the function of an eye 180 when the lens 184 is focused at infinity or at a finite distance, respectively, will now be described.

As seen in FIG. 20, the lens 184 of the eye 180 is focused at infinity and the pupil 182 is illuminated by the two beams of light, beam 1200 and beam 1202, which produce images $P_1$ and $P_2$ respectively at the retina 186. FIG. 21 shows a lens 184 of the eye 180 focused at a finite distance rather than at infinity, with the lens 184 having a shorter focal length. Due to a shorter focal length of the lens 184 in FIG. 21, the images $P_1$ and $P_2$ converge to a single image. As the images $P_1$ and $P_2$ are projected through small sub-apertures onto the pupil 182, the blurring of the images $P_1$ and $P_2$ is small when the focal length of the lens 184 of the eye 180 changes.

FIGS. 22 and 23 illustrate embodiments of the image projection assemblies 110 and 210 projecting beams 1300 and 1302 that correspond to different points in the FOV and different angular sub-apertures of the PODs 112 and 212 onto EMB 128, illuminating different areas of the pupil 182 as shown in FIGS. 20 and 21. While shown as having particular components, the image projection assemblies 110 and 210 may each include any of the components of the LOEs, PODS, illumination systems or other portions of the optical system 100 found in the various embodiments described herein.

With reference now to FIG. 24, in some embodiments, the controller 140 is configured to split the projection of a single image into multiple frames, e.g., frame 1, frame 2 . . . frame n, and to project each frame in sequence to the eye 180 of the user. The controller 140 in this embodiment is configured to shift a location of the image 13001, 13002, . . . 1300n in each successive frame 1, 2, . . . n such that objects in the images 13001, 13002, . . . 1300n of successive frames 1–n are slightly shifted relative to a previous frame as shown in FIG. 24. The controller 140 is configured to project the frames one at a time in succession at a high speed and in some embodiments, may project one or more of the shifted frames using different sub-apertures of the POD 112 by activating different light sources in the array 306. As seen in FIG. 24, for example, the image 1300n of frame n is shifted by a distance e relative to the image 13001 of frame 1. In this manner, controller 140 may simulate a one-dimensional light field using time-multiplexed projection of the frames of the image.

In some cases, the time-multiplexed light field projection described above is created in only one dimension, e.g., along the axis X in FIG. 22. Along the axis Z, the beam of the image is wide and illuminates the full aperture of an eye in Z direction due to the pupil expansion by facets 124. Because of this, the image in the Z direction is sharp only when the eye is focused at infinity and as the accommodation of the eye changes to a finite focal distance, the image becomes blurred in the Z direction.

Figure 25A:
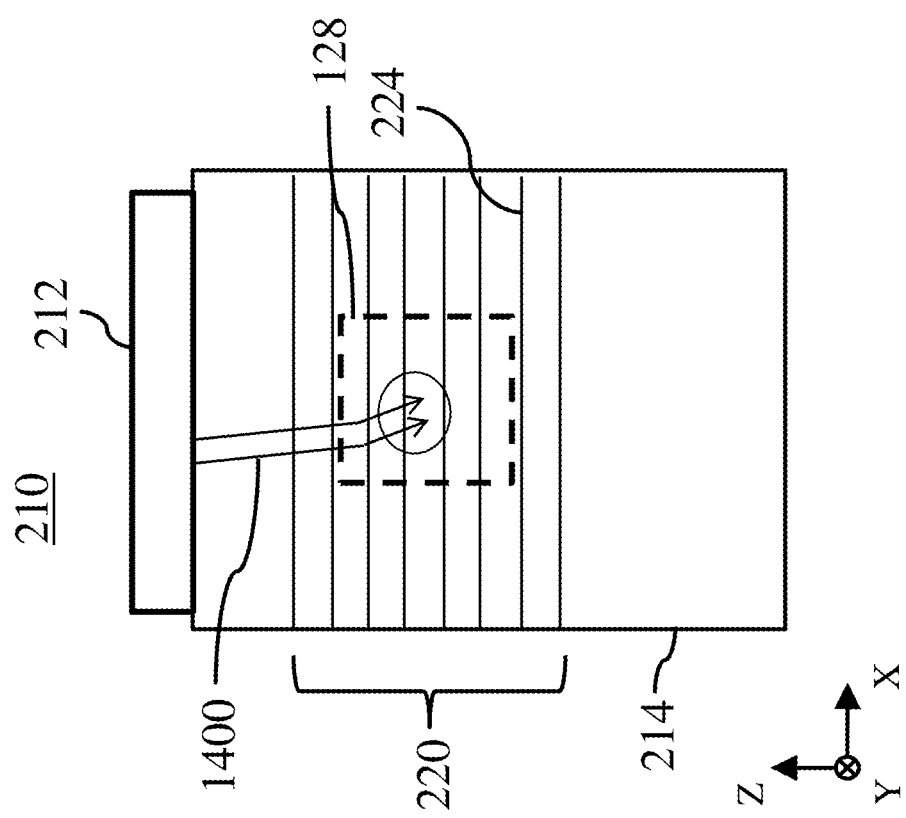
FIGS. 25A-25C are schematic diagrams illustrating an image projection assembly of the optical system of FIG. 1 having a dynamic facet structure according to an embodiment.
Figures 25B, 25C:
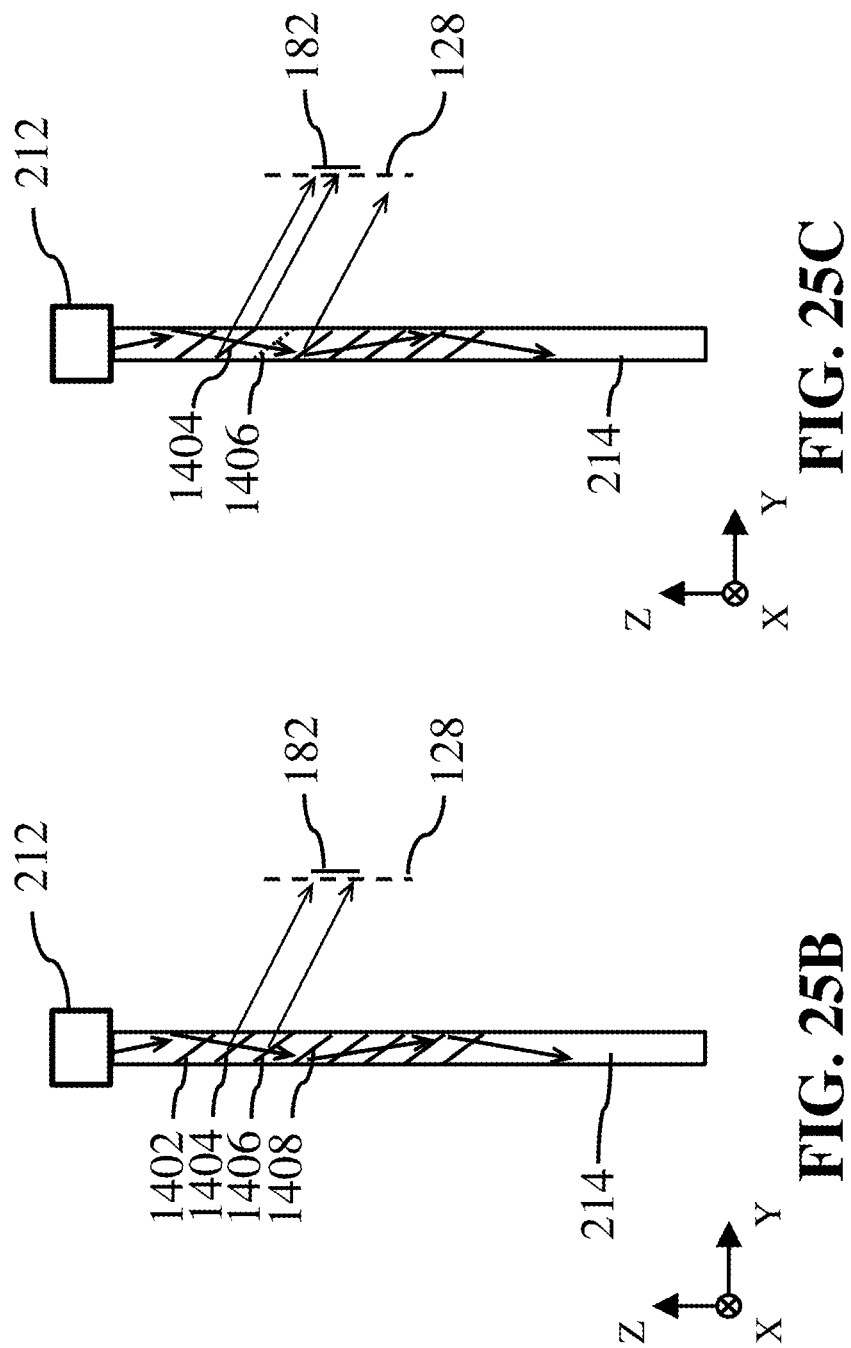

With reference to FIGS. 25A-25C, an embodiment of image projection assembly 210 is illustrated in which blurring in the Z direction for a time-multiplexed light field projection such as that described above may be overcome. For example, the aperture of the beam 1400 in the Z-direction may be limited, e.g., by dynamically increasing or decreasing at least one of the reflectivity and the intensity of some of the facets 224, e.g., dynamically making them either more reflective or more transparent. As an example, one or both of the reflectivity and intensity of the facets 224 of the LOE 214 is configured to be dynamically adjusted in the embodiment shown in FIGS. 25A-25C. While described with reference to image projection assembly 210, in other embodiments image projection assembly 110 may alternatively be utilized.

While the size of the beam 1400 in X-dimension is limited due to the illumination system, e.g., any of the illumination systems 300, 600, 800 and 900 or other components described herein, in the Z-direction, the beam 1400 illuminates the complete EMB 128 by reflection from facets 1402, 1404, 1406 and 1408 as shown in FIG. 25B. In the example shown in FIG. 25B, the reflections from the facets 1404 and 1406 illuminate the pupil 182 at a particular position in the EMB 128 while reflections from the other facets, e.g., the facets 1402, 1408 and others, do not illuminate the pupil 182 at the particular position in the EMB 128. If the facet 1406 becomes transparent (non-reflective) as shown in FIG. 25C, only a part of the pupil 182 in the Z-direction is illuminated. By dynamically adjusting one or both of the reflectivity and the intensity of each facet, the image of a point on the retina 186 may be made sharp in the Z-direction for any position of the pupil 182 and any accommodation of the lens 184 of the eye 180.

Figure 26:
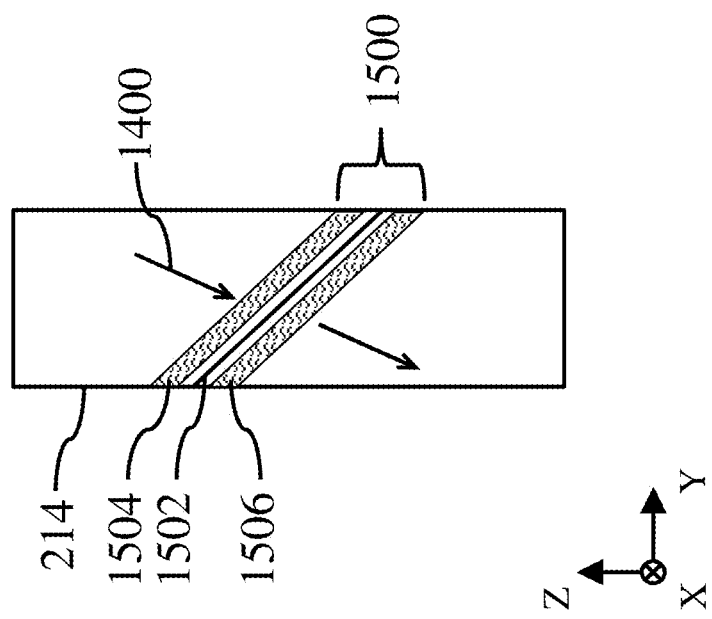
FIG. 26 is a schematic diagram illustrating the dynamic facet structure of FIG. 25 according to an embodiment.
Figure 27:
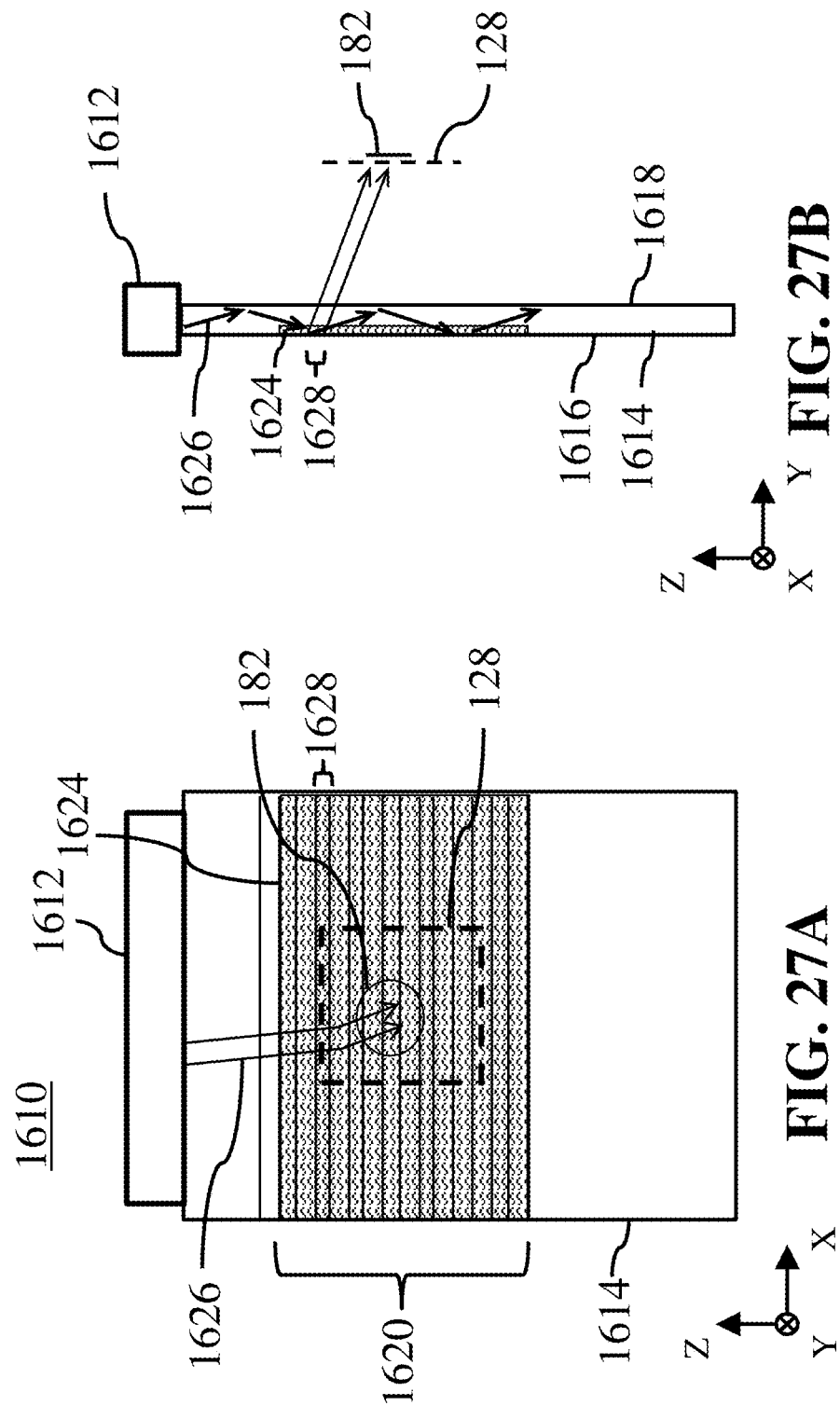
FIGS. 27A and 27B are schematic diagrams illustrating an image projection assembly of the optical system of FIG. 1 having a switchable Bragg reflector (SBR) according to an embodiment.

With reference now to FIG. 26, a dynamic facet structure 1500 is illustrated for controlling one or both of the reflectivity and the intensity of a facet 1502 according to some embodiments. Facet 1502 may be highly transmissive for p-polarization and partially reflective for s-polarization. Dynamic facet structure 1500 includes facet 1502 disposed between a first liquid crystal layer 1504 and a second liquid crystal layer 1506. Liquid crystal layers 1504 and 1506 are parallel in some embodiments and may be parallel to the facet 1502. The state of the liquid crystal in each of the liquid crystal layers 1504 and 1506 is controlled by electric voltage applied to the layer, e.g., by controller 140 (FIG. 1). In an "on" state, the liquid crystal of each liquid crystal layer 1504 and 1506 works as a half wave plate that rotates the polarization of the beam 1400 by 90 degrees. In an "off" state, the polarization state of the beam 1400 does not change after passing through the layer of liquid crystal.

In this embodiment, the beam 1400 propagating in the LOE 214 is s-polarized and the facet 1502 is highly transmissive for p-polarization and partially reflective for s-polarization as mentioned above. In other embodiments, the beam 1400 propagating in the LOE 214 may be p-polarized and the facet 1502 may be highly transmissive for s-polarization and partially reflective for p-polarization.

With liquid crystal layers 1504 and 1506 in the "off" state, the polarization of the beam 1400 when it encounters the facet 1502 is s-polarization and the facet 1502 is partially reflective for the beam 1400, e.g., as shown by facet 1404 in FIG. 25C. When the liquid crystal layers 1504 and 1506 are in the "on" state, the beam polarization is p-polarization at the facet 1502, and the facet 1502 is transparent for the beam 1400, e.g., as shown by facet 1406 in FIG. 25C.

Note that because there is a liquid crystal layer disposed on either side of the facet 1502, e.g., the liquid crystal layer 1504 disposed on one side of the facet 1502 and the liquid crystal layer 1506 disposed on the other side of the facet 1502, when in the "on" state, the polarization of the beam 1400 will change from s-polarization before encountering the dynamic facet structure 1500 to p-polarization after passing through the liquid crystal layer 1504. The beam 1400 will encounter the facet 1502 while having p-polarization and pass through due to the high transmissivity of the facet 1502 at p-polarization. Then the beam 1400 will encounter liquid crystal layer 1506 on the other side of the facet 1502 and change from p-polarization back to s-polarization. The beam 1400 then exits the dynamic facet structure 1500 while having s-polarization. In this manner each dynamic facet structure 1500 may be independently controlled by controller 140 (FIG. 1) to reflect or transmit the beam 1400 without affecting the polarization of the beam 1400 for any of the other facets.

In another embodiment, one or both of the reflectivity and the intensity of the facets 224 may alternatively be dynamically controlled using electrically switchable Bragg reflectors. For example, in some embodiments, each of the facets 224 of the coupling-out arrangement 220 may include an electrically switchable Bragg reflector whose reflectivity, intensity or both may be electrically controlled by controller 140.

With reference now to FIGS. 27A and 27B, an image projection assembly 1610 according to some embodiments will now be described. Image projection assembly includes a POD 1612 that may include similar components and functionality to the PODs 112, 212 or any other PODS disclosed herein. Image projection assembly includes an LOE 1614 that may include at least some similar components and functionality to the LOEs 114, 214 or any of the other LOEs disclosed herein except as described in more detail below. POD 1612 is configured to output a light beam 1626 to LOE 1614 that is directed by a coupling-out arrangement 1620 to EMB 128 and pupil 182.

In the embodiment of FIGS. 27A and 27B, the coupling-out arrangement 1620 includes a switchable Bragg reflector (SBR) 1624 disposed on one of the major external surfaces 1616 or 1618 of the LOE 1614, for example, as shown in FIGS. 27A and 27B. For example, in some embodiments, the SBR 1624 may be integrated into the major external surface 1616. When in the "on" state the SBR 1624 is configured to reflect the light beam 1626 towards the location of the pupil 182 in the EMB 128. When in the "off" state the SBR 1624 provides total internal reflectivity such that the light beam 1626 propagates inside the waveguide. In some embodiments, the SBR 1624 is split into multiple selectively activatable regions, e.g., including a region 1628, which may be controlled independently by controller 140. By switching "on" selected regions of the SBR 1624, a target portion of the pupil 182 may be illuminated, for example, as shown with selected region 1628 in FIG. 27B. In another embodiment, a transmissive switchable grating may alternatively be used instead of the SBR 1624.

Figure 28:
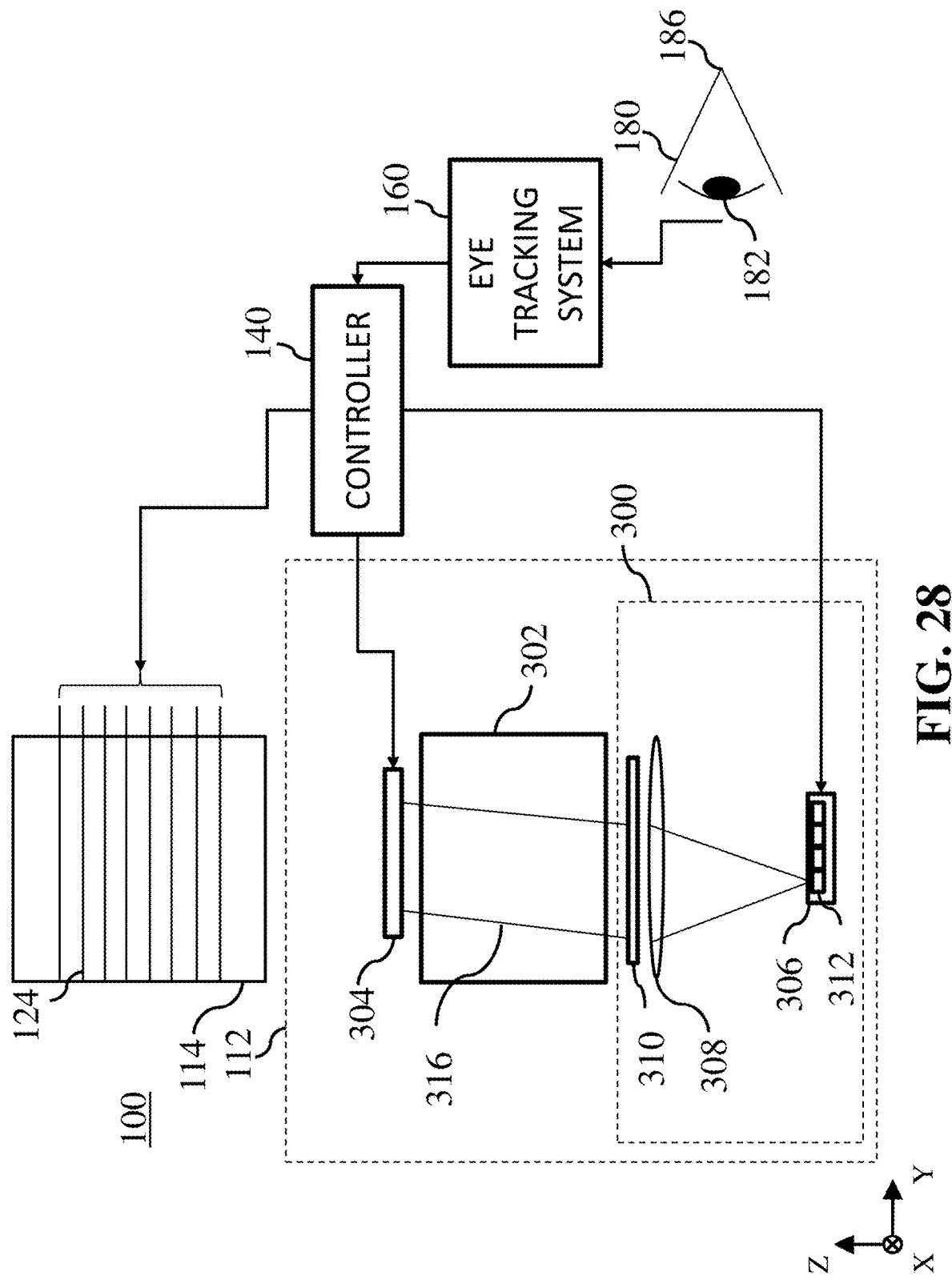
FIG. 28 is a schematic diagram illustrating the optical system of FIG. 12 with the controller further controlling at least one of a reflectivity and an intensity of the facets of the LOE according to an embodiment.

Referring to FIG. 28, an embodiment of the optical system 100 with a 2D light field projection in which the controller 140 is further configured to control the dynamic facet structures 1500 or the SBR 1624 will now be described. For example, the eye tracking system 160 determines the location of the pupil 182 relative to the LOE 114 and provides this location to the controller 140 as location information. The controller 140 uses the location information to determine a light source or light sources in the array 306 that may be activated to project an image onto the pupil 182 at the determined location and determines the distortions to be applied to the image by the SLM 304 to compensate for image movement on the retina 186 due to aberrations of the POD 112 and reflective optical arrangement 122 in the 2D expansion system of FIGS. 2A-2C or the POD 212 in the ID expansion system of FIG. 3 as described above.

In this embodiment, the controller 140 is also configured to determine which of the facets 124 in the LOE 114 are selected to be set to the "on" state (semi-reflective) and the "off" state (transmissive) to enhance the sharpness of the image in the Z-direction due to changes in the accommodation of the lens 184 of the eye 180, e.g., as described above. For example, to project an image of an object located at infinity, only a single image need be projected. However, to project an image of an object located at a final distance, multiple images need to be projected, for example, as explained above with reference to FIGS. 20-24.

In one example scenario, an image of an object located at a finite distance from the user is projected. For a given position of the pupil 182, multiple images, e.g., 2 images, 3 images, . . . 100 images, or more, are projected through different sub-apertures of the pupil 182. For each sub-aperture projection, the image is distorted twice. The first distortion is configured to compensate for the distortions caused by aberrations such as those shown in FIGS. 13A-C. The second distortion is configured to shift the image to create a light field, for example, as shown in FIGS. 20 and 21.

Figure 29:
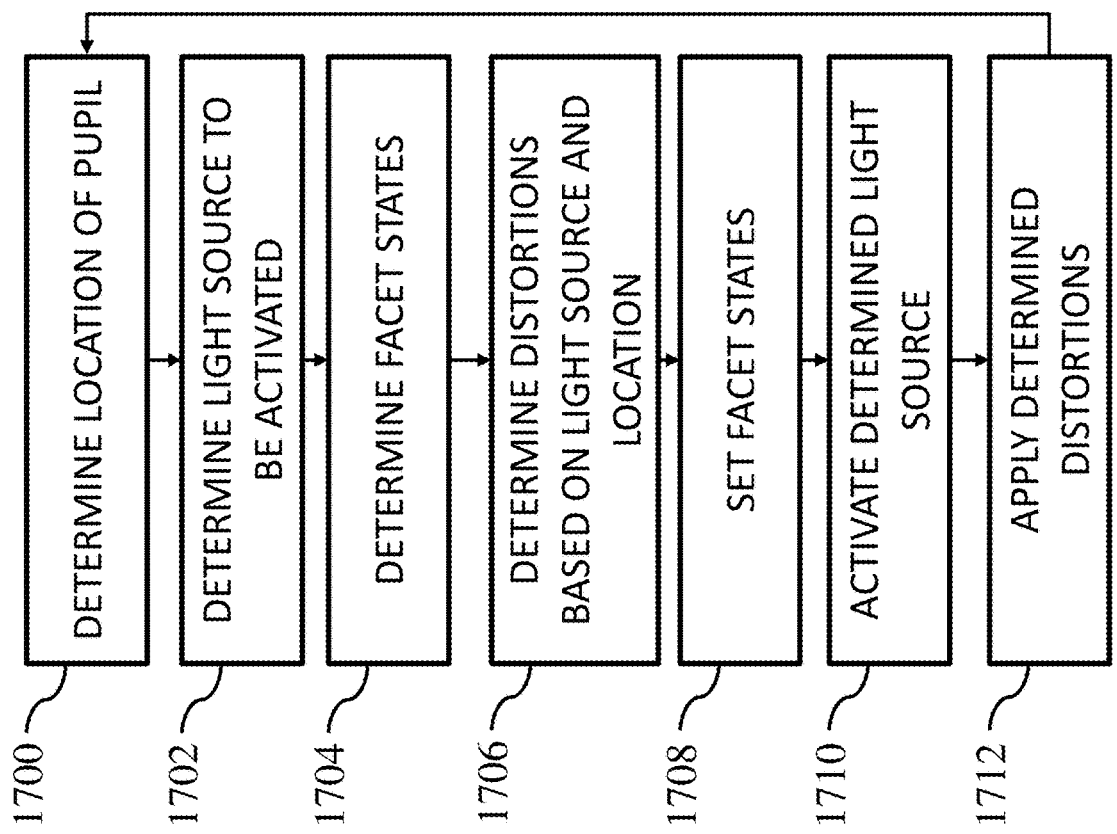
FIG. 29 is a flow diagram of an example process for partial eye pupil illumination and selective eye motion box (EMB) illumination with time-multiplexed light field imaging according to an embodiment.

With reference to FIG. 29, an example process for operating the optical system 100 of FIG. 28 including control of the selectively activatable facets 124 will now be described. The process may be performed at least in part by the controller 140, the eye tracking system 160, the POD 112 and the LOE 114 or may be performed at least in part by other portions of the optical system 100.

The process of FIG. 29 includes steps 1700 through 1712. While the process of FIG. 29 is described herein as having particular steps or a particular order of steps, the process may alternatively perform the steps in any order, may include additional steps, may include fewer steps or may only perform a portion of the steps described below in other embodiments.

At step 1700, the eye tracking system 160 determines the location of the pupil 182, e.g., using one or more eye tracking cameras or other optical elements, and provides location information corresponding to the determined location, e.g., coordinates or other information, to the controller 140.

At step 1702, the controller 140 determines a light source in the array 306 that may be activated to project an image onto a portion of the pupil 182. For example, the controller 140 may maintain a coordinate map of the EMB 128 that indicates which light source corresponds to each portion of the EMB 128. The controller 140 may select the light source to be activated based at least in part on a comparison between the location information and the coordinate map, e.g., by determining the location of the pupil 182 relative to the EMB 128 and identifying the corresponding light source based on the coordinate map.

At step 1704, the controller 140 determines which of the facets 124 need to be set to the "on" state and which of the facets 124 need to be set to the "off" state, for example, as described above.

At step 1706, the controller 140 determines which distortions to apply to the image at the SLM 304 based at least in part on the identified light source to be activated. In some embodiments, the distortions may also or alternatively be determined based at least in part on the location information, e.g., in a case where multiple light sources may be utilized to illuminate the same location but with light beams having different collimated angles. In some embodiments, the controller 140 may determine the distortions to be applied in a similar manner to that described above for step 504 of FIG. 13 or in any other manner.

At step 1708, the controller 140 applies the appropriate control signals to the facets 124 to set them to the determined "on" or "off" states.

At step 1710, the controller 140 activates the identified light source to output the image.

At step 1712, the controller 140 provides the SLM 304 with the determined distortions to be applied to the image before providing the image to the LOE 114. The image is then projected onto a portion of the pupil 182 by the facets 124 of the LOE 114 that were set to the "on" state and the process returns to step 1700 and continues for each frame of the image. In this manner, changes to the location of the pupil 182 are taken into account, the impact of changes in the accommodation of the eye 180 on the sharpness of the image are mitigated, corresponding light sources are activated, and appropriate distortions are applied to generate an image with as few distortions as possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
    at least one processor configured to:
        determine a pupil location of a pupil of an eye of a user relative to an eye motion box;
        select a light source from a plurality of light sources based at least in part on the pupil location, the light source being configured to illuminate a portion of the eye motion box that corresponds to the pupil location with an image for consumption by the user;
        determine, based at least in part on a projection distance corresponding to the image, respective states of a plurality of selectively activatable facets;
        cause the selectively activatable facets to be set to the states; and
        activate the light source to illuminate the portion of the eye motion box with the image.

2. The apparatus of claim 1, wherein the light source is configured to illuminate only a portion of the pupil with the image.

3. The apparatus of claim 1, wherein the at least one processor is configured to:
    determine a distortion to be applied to the image based at least in part on the light source; and
    cause a modification of the image based at least in part on the distortion.

4. The apparatus of claim 3, wherein:
    the at least one processor is configured to determine an aberration induced by a collimator; and
    the determination of the distortion is based on the aberration.

5. The apparatus of claim 3, wherein the causing the modification comprises causing a spatial light modulator to modify the image based at least in part on the distortion.

6. The apparatus of claim 1, wherein the at least one processor is further configured to:
    determine a target state of a coupling-out element based at least in part on the light source; and
    cause the coupling-out element to be set to the target state.

7. The apparatus of claim 1, wherein the at least one processor is configured to:
    select another light source of the plurality of light sources based at least in part on the pupil location; and
    activate the other light source to illuminate the portion of the eye motion box with the image.

8. A method comprising:
    determining a pupil location of a pupil of an eye of a user relative to an eye motion box;
    selecting a light source from a plurality of light sources based at least in part on the pupil location, the light source being configured to illuminate a portion of the eye motion box that corresponds to the pupil location with an image for consumption by the user;
    determining, based at least in part on a projection distance corresponding to the image, respective states of a plurality of selectively activatable facets;
    causing the selectively activatable facets to be set to the states; and
    activating the light source to illuminate the portion of the eye motion box with the image.

9. The method of claim 8, wherein the light source is configured to illuminate only a portion of the pupil with the image.

10. The method of claim 8, further comprising:
    determining a distortion to be applied to the image based at least in part on the light source; and
    causing a modification of the image based at least in part on the distortion.

11. The method of claim 10, further comprising determining an aberration induced by a collimator, wherein the determining the distortion is based on the aberration.

12. The method of claim 10, wherein causing the modification comprises causing a spatial light modulator to modify the image based at least in part on the distortion.

13. The method of claim 8, further comprising:
    determining a target state of a coupling-out element based at least in part on the light source; and
    causing the coupling-out element to be set to the target state.

14. The method of claim 8, further comprising:
    selecting another light source of the plurality of light sources based at least in part on the pupil location; and
    activating the other light source to illuminate the portion of the eye motion box with the image.

15. An optical system comprising:
    a plurality of light sources;
    an eye motion box; and
    a controller configured to:
        determine a pupil location of a pupil of an eye of a user relative to the eye motion box;
        select a light source from the plurality of light sources based at least in part on the pupil location, the light source being configured to illuminate a portion of the eye motion box that corresponds to the pupil location with an image for consumption by the user;
        determine, based at least in part on a projection distance corresponding to the image, respective states of a plurality of selectively activatable facets;

cause the selectively activatable facets to be set to the states; and activate the light source to illuminate the portion of the eye motion box with the image.

16. The optical system of claim 15, wherein the determination of the pupil location is based on communication from an eye tracking system.

17. The optical system of claim 15, wherein:

the optical system comprises a spatial light modulator; and the controller is configured to:

determine a distortion to be applied to the image based at least in part on the light source; and cause the spatial light modulator to distort the image.

18. The optical system of claim 17, further comprising an optical arrangement comprising:

a first lens;

a second lens;

a first micro-lens array disposed between the first lens and the second lens; and a second micro-lens array disposed between the first micro-lens array and the second lens, wherein the first lens, the second lens, the first micro-lens array, and the second micro-lens array are, collectively, configured to direct the image from the selected light source toward the spatial light modulator.

19. The optical system of claim 18, wherein:

the plurality of light sources is located within a focal plane of the first lens;

the second micro-lens array is located within a focal plane of the first micro-lens array; and the spatial light modulator is located within a focal plane of the second lens.

20. The optical system of claim 15, wherein:

the optical system comprises a coupling-out element configurable to one of a plurality of states; and the controller is configured to:

determine a state for the coupling-out element based at least in part on the light source; and cause the coupling-out element to be set to the state.

* * * * *